United States Patent [19]
Schuler et al.

[11] Patent Number: 5,855,005
[45] Date of Patent: Dec. 29, 1998

[54] SYSTEM FOR ELECTRONICALLY AUDITING EXPOSURES USED FOR DETERMINING INSURANCE PREMIUMS

[75] Inventors: Michael S. Schuler, Pitman; Kristin Ford, Delran; George Snyder, Williamstown, all of N.J.

[73] Assignee: Insurance Company of North America, Philadelphia, Pa.

[21] Appl. No.: 672,111

[22] Filed: Jun. 24, 1996

[51] Int. Cl.[6] .................................................. G06F 19/00
[52] U.S. Cl. ........................ 705/4; 395/204; 364/710.04
[58] Field of Search .............................. 364/401, 401 R, 364/710.04; 395/204, 236; 705/1, 4

[56] References Cited

U.S. PATENT DOCUMENTS

| | | | |
|---|---|---|---|
| 4,799,156 | 1/1989 | Shavit et al. ............................ | 364/401 |
| 5,191,522 | 3/1993 | Bosco et al. ............................ | 364/401 |
| 5,590,037 | 12/1996 | Ryan et al. ............................. | 395/204 |
| 5,631,828 | 5/1997 | Hagan ..................................... | 395/204 |
| 5,655,085 | 8/1997 | Ryan et al. ......................... | 364/401 R |
| 5,689,650 | 11/1997 | McClelland et al. .................. | 395/236 |
| 5,704,044 | 12/1997 | Tarter et al. ............................ | 395/204 |

*Primary Examiner*—Kevin J. Teska
*Assistant Examiner*—Russell W. Frejd
*Attorney, Agent, or Firm*—Reed Smith Shaw & McClay LLP

[57] ABSTRACT

A computer-implemented system for auditing a total exposure of an entity, the total exposure forming the basis of a premium amount to be charged to the entity for an insurance policy. A first means for receiving a plurality of exposure information records from a first source is provided. Each of the exposure information records from the first source corresponds to a location of the entity and a class code associated with the location of the entity. A database, coupled to the first means for receiving, is provided for storing the exposure records from the first source. Each of the exposure records from the first source is stored in the database as a datastructure having an entity number field for storing a code that uniquely identifies the entity in the database, a location field for storing information representing a geographical location of the entity, a class code field for storing information representing a class code associated with the entity, and an amount field for storing an exposure amount associated with the geographical location and the class code stored in the location and class code fields, respectively, of the datastructure. A totaling means is provided for determining a first total exposure amount associated with the entity from the exposure records from the first source. A second receiving means is provided for receiving a second total exposure amount associated with the entity from a second source that is different from the first source. A reconciliation means reconciles the first total amount by comparing the first total amount to the second total amount. The reconciliation means includes means for entering into the system an explanation of a deviation between the first total amount and the second total amount.

10 Claims, 28 Drawing Sheets

POLICY NUMBER
AUDIT PERIOD
ANALYSIS
END
END

1900

Policy Number 0
  Audit Period 1/0/00
                1/0/00

RECONCILIATION

Net Total from Summary     $0
      − Total Inclusions     $0
      + Total Exclusions     $0
+ Total State/Off Excl     $0
        Gross Payroll     $0        Deviation:     $0

Reason for Deviation: [   ]

VERIFICATION

Year    Period    Amount    Verification Records

| 940's s Annual |  |
|---|---|
| 941's s Quarterly |  |
| W-2/W-3 |  |
| 1099's/1096 |  |
| State U/C Return |  |
| Corporate Tax Return |  |
| 1040 Ind. Tax Return |  |
| Partnership Tax Return |  |

1910

Total: $0      1920

Total Gross from Worksheet:   $0       Deviation:   1930   $0

Please Document the Reason(s) for Deviation:    1940

Notice to Underwriter

Policy # [C40571061]  Eff Date: [11/18/94]  Exp Date: [11/18/95]
Insured Name: [SPIRIT ENTERPRISES INC]

The Premium Audit developed the Following Information:

Date of Notice: [ ]  Audit Period Start Date: [11/18/94]
To: [ ]  Audit Period End Date: [11/18/95]
From: [ ]  Phone #: [ ]

POLICY CHANGES:

Insured's Name ☐
Address ☐
Legal Description of Insured ☐
Other ☐

INSURED RECORDS:

Not Available ☐
Unsatisfactory ☐
Non-Productive Audit ☐

EXPOSURE CHANGES:

Governing Class Changed ☐
Add/Delete Class ☐
Add/Delete Location ☐
Add/Delete State ☐
Exposure Increase/Decrease ☐
Other ☐

PREMIUM CONSIDERATIONS:

Inadequate Deposit ☐
Potential Collection Problem ☐

SUB-CONTRACTORS:

Uninsured Contractors ☐
Insured Contractors ☐
Inadequate Limits for GL ☐

SPECIAL CONSIDERATIONS:

Recommend Bureau Inspection ☐
Recommend LCS Inspection ☐
Condition of Premises/Equipment ☐

Comments:

*Fig. 22*

SYSTEM FOR ELECTRONICALLY AUDITING EXPOSURES USED FOR DETERMINING INSURANCE PREMIUMS

FIELD OF THE INVENTION

The present invention relates generally to auditing systems used for monitoring the activities of a business entity. More specifically, the present invention relates to computer systems for auditing business entities. Still more specifically, the present invention relates to a computer system for auditing the exposure amounts which an insurance company uses to calculate the policy premium charged to an insured business entity.

BACKGROUND

In order to determine the appropriate premium to charge an insured, an insurance company or underwriter setting the premium must have an accurate assessment of the insured's total exposure. An insured's total exposure is often based on criteria such as, for example, the total dollar volume of the insured's sales, the type of business engaged in by the insured, the total payroll of the insured, the number and types of vehicles used by the insured, etc. This exposure information may be provided by the insured to an insurance company or underwriter at the time that an insurance policy is initially quoted or, alternatively, through a preliminary audit conducted by the insurance company. At the time that a policy is up for renewal, it is desirable to have the ability to audit the insured (perhaps a second time if a preliminary audit was done) in order to confirm whether the insured's total exposure has changed and, if such a change has occurred, to adjust the insured's premium accordingly. In addition, at the time that a policy is canceled or expires, it is desirable to have the ability to audit the insured to confirm whether the insured's total exposure changed during the policy period and, if such a change occurred, to assess (or refund) any back premiums due as a result of the change in the insured's exposure.

Auditing an insured is complicated by the fact that the business of an insured is often spread out over multiple locations, and multiple auditors may need to be employed at different sites of the insured for gathering the information required for the audit. Thus, information gathered by different auditors from different locations may need to be assembled and combined in order to complete an audit of an insured.

It is therefore an object of the present invention to provide a system for auditing an insured in order to assess an insured's total exposure.

It is a further object of the present invention to provide a system for auditing an insured in order to determine whether the insured's total exposure has changed since the inception of a policy.

It a still further object of the present invention to provide a system for automatically and electronically assembling and combining information gathered by different auditors from different locations of an insured in order to complete an audit.

These and other objects and advantages of the invention will become more fully apparent from the description and claims which follow or may be learned by the practice of the invention.

SUMMARY OF THE INVENTION

The present invention is directed to a computer-implemented system for auditing a total exposure of an entity, the total exposure forming the basis of a premium amount to be charged to the entity for an insurance policy. A first means for receiving a plurality of exposure information records from a first source is provided. Each of the exposure information records from the first source corresponds to a location of the entity and a class code associated with the location of the entity. A database, coupled to the first means for receiving, is provided for storing the exposure records from the first source. Each of the exposure records from the first source is stored in the database as a datastructure having an entity number field for storing a code that uniquely identifies the entity in the database, a location field for storing information representing a geographical location of the entity, a class code field for storing information representing a class code associated with the entity, and an amount field for storing an exposure amount associated with the geographical location and the class code stored in the location and class code fields, respectively, of the datastructure. A totaling means is provided for determining a first total exposure amount associated with the entity from the exposure records from the first source. A second receiving means is provided for receiving a second total exposure amount associated with the entity from a second source that is different from the first source. A reconciliation means reconciles the first total amount by comparing the first total amount to the second total amount. The reconciliation means includes means for entering into the system an explanation of a deviation between the first total amount and the second total amount.

BRIEF DESCRIPTION OF THE DRAWINGS

In order that the manner in which the above-recited and other advantages and objects of the invention are obtained and can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

FIG. 10 illustrates a graphical user interface used by an auditor for displaying a chronological listing of all auditing activities related to a policy, in accordance with a preferred embodiment of the present invention.

FIG. 12 illustrates a graphical user interface used by an auditor for entering information representing each location which will have to be audited in order to complete an audit for an insured entity, in accordance with a preferred embodiment of the present invention.

FIG. 17 illustrates a graphical user interface which shows an exemplary analysis sheet for compiling figures to be listed on the worksheet shown in FIG. 16.

FIG. 19 illustrates a graphical user interface used by an auditor for reconciling and verifying audit information, in accordance with a preferred embodiment of the present invention.

FIG. 22 illustrates an exemplary underwriter notice generated in accordance with a preferred embodiment of the present invention.

DETAILED DESCRIPTION OF THE INVENTION

The present invention is a computer-implemented software system for auditing the exposure of an insured. For purposes of the present invention, an insured is a person or business that holds one or more types of insurance coverages. Thus, for example, an insured with general liability coverage, automotive coverage, and workers compensation coverage, holds three separate types of insurance coverages. In addition, an insured may be made up of several entities, each of which represents a division or subsidiary of the insured. The present invention is adapted to perform auditing of an insured at the "entity" level for each type of coverage held by the entity. Thus, if an insured which was comprised of three entities, each of which held two types of coverages, were to be fully audited using the present invention, six separate audits could be generated for the insured. In accordance with a preferred embodiment described below, the separate audits may be performed by different auditors working at different locations, and then assembled electronically at a central or home office into a single consolidated audit report for the insured.

Each entity audited using the present invention may be engaged in several different lines of businesses. Each line of business engaged in by the entity is classified during the auditing process into one of the Standard Industrial Classification ("SIC") codes used for describing business activities. In addition to engaging in several lines of businesses, an individual entity may do business from several different locations, and may have employees falling into one or more different class codes (e.g., clerical, administrative, factory, etc.) at any particular location. As explained more fully below, an entity is audited by first gathering financial information for business activity corresponding to each class code at each location where the entity does business, consolidating this information for the entity as a whole, and then reconciling and verifying the consolidated information.

Figure 1:
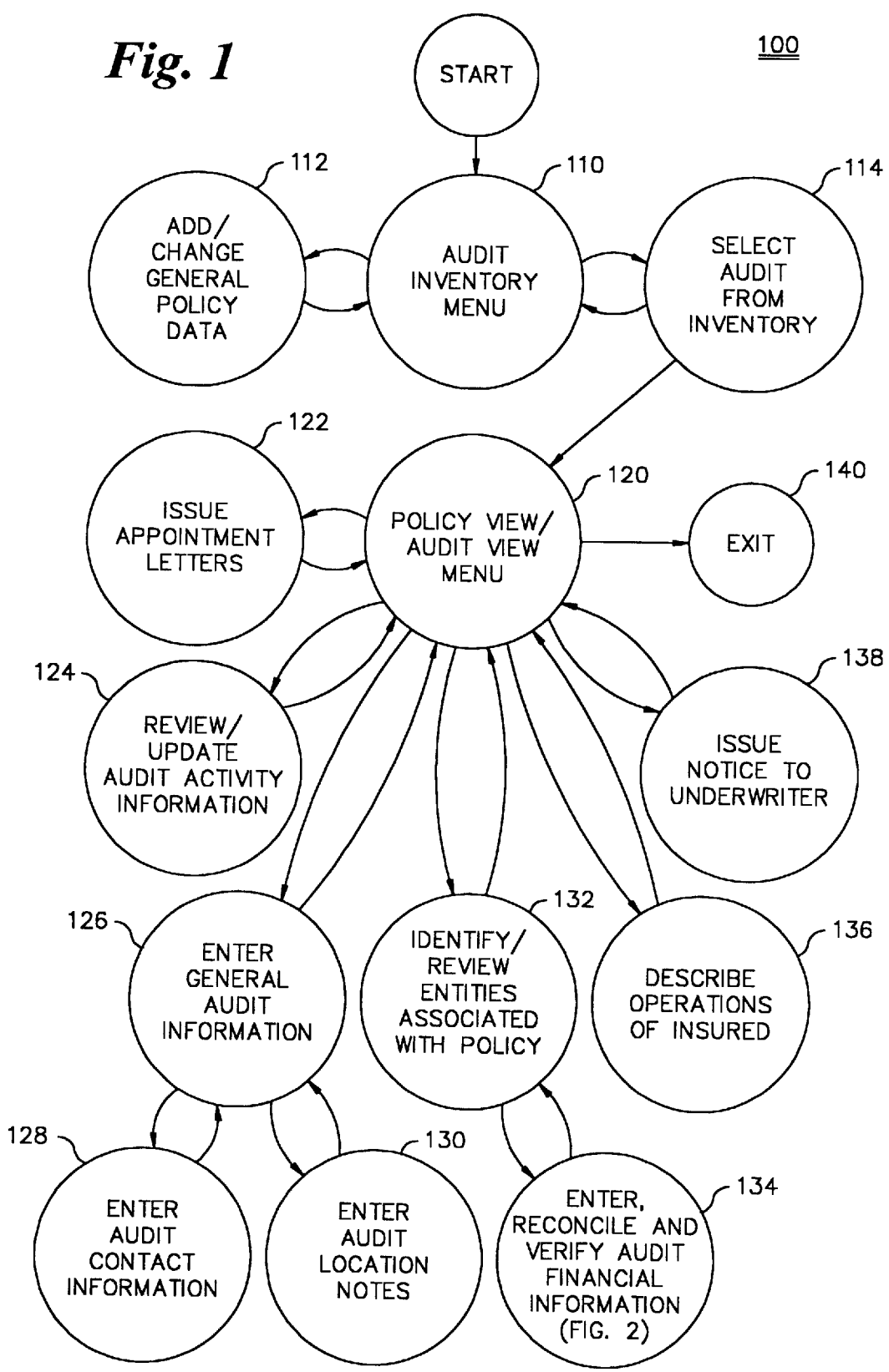
FIG. 1 is a flow diagram illustrating the operation of a computer-implemented system for auditing the exposure of an insured, in accordance with a preferred embodiment of the, present invention.
Figure 5:
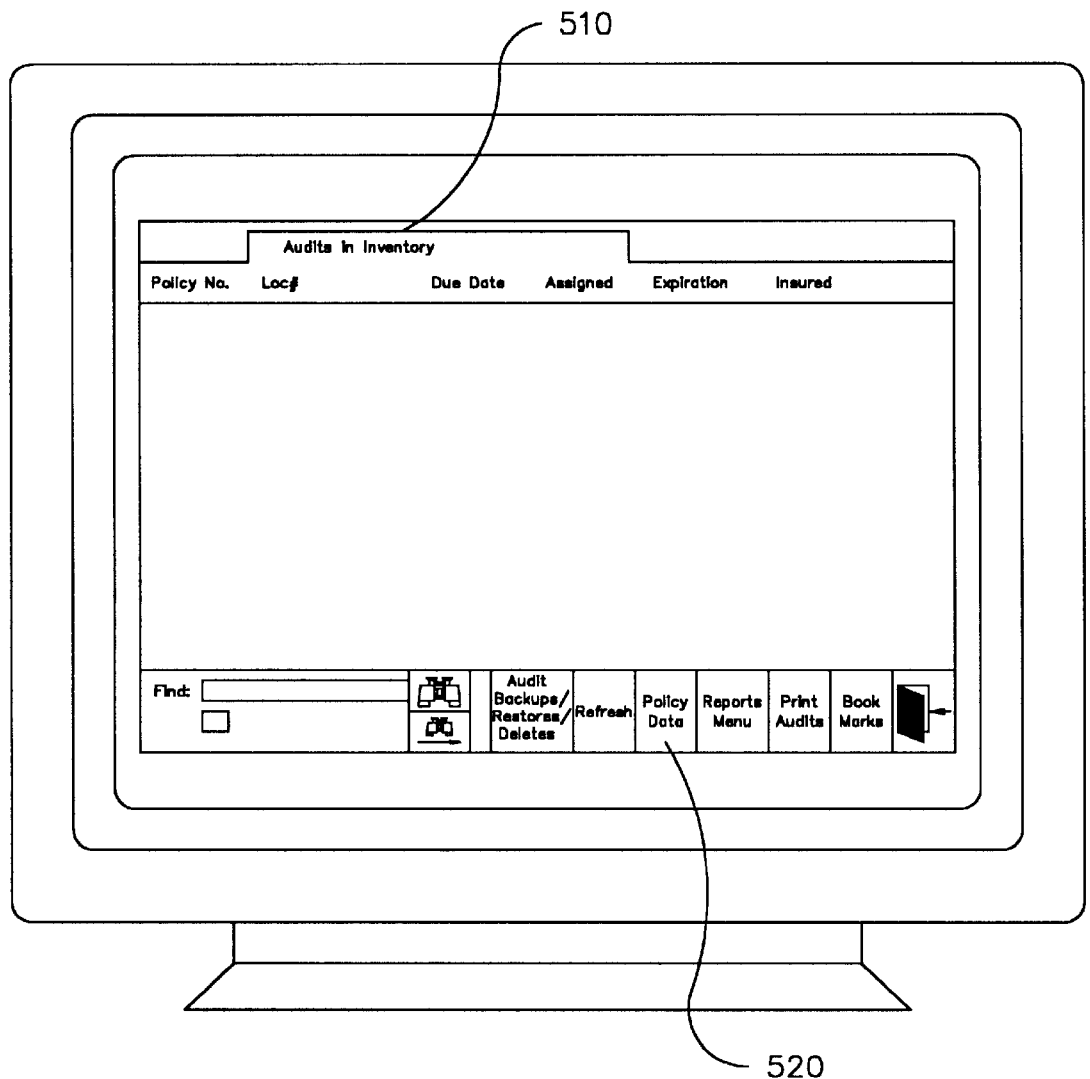
FIG. 5 illustrates a graphical user interface used by an auditor for viewing individual audits in the auditor's inventory, in accordance with a preferred embodiment of the present invention.

Referring now to FIG. 1, there is shown a flow diagram illustrating the operation of a computer-implemented software system 100 for auditing the exposure of an insured, in accordance with a preferred embodiment of the present invention. An auditor using system 100 begins at step 110 with an Audit Inventory Menu screen, an example of which is shown in FIG. 5. When an auditor clicks on the "Audits in Inventory" text 510 in the Audit Inventory Menu screen, system 100 will display a list of all outstanding and scheduled audits assigned to the auditor, as well as a list of audits completed by the auditor. The information displayed for each audit (i.e., policy number, location, due date, assignment information, expiration date, and insured name) is retrieved from a database 400, the general structure of which is depicted in FIGS. 4A–4G and, more particularly, from data records 402 and 404 which are shown specifically on FIGS. 4A and 4D, respectively. The inventory listing retrieved using the Audit Inventory Menu may be used by an auditor (or an auditor's supervisor) for administrative purposes in order to monitor an auditor's workload.

Figure 6:
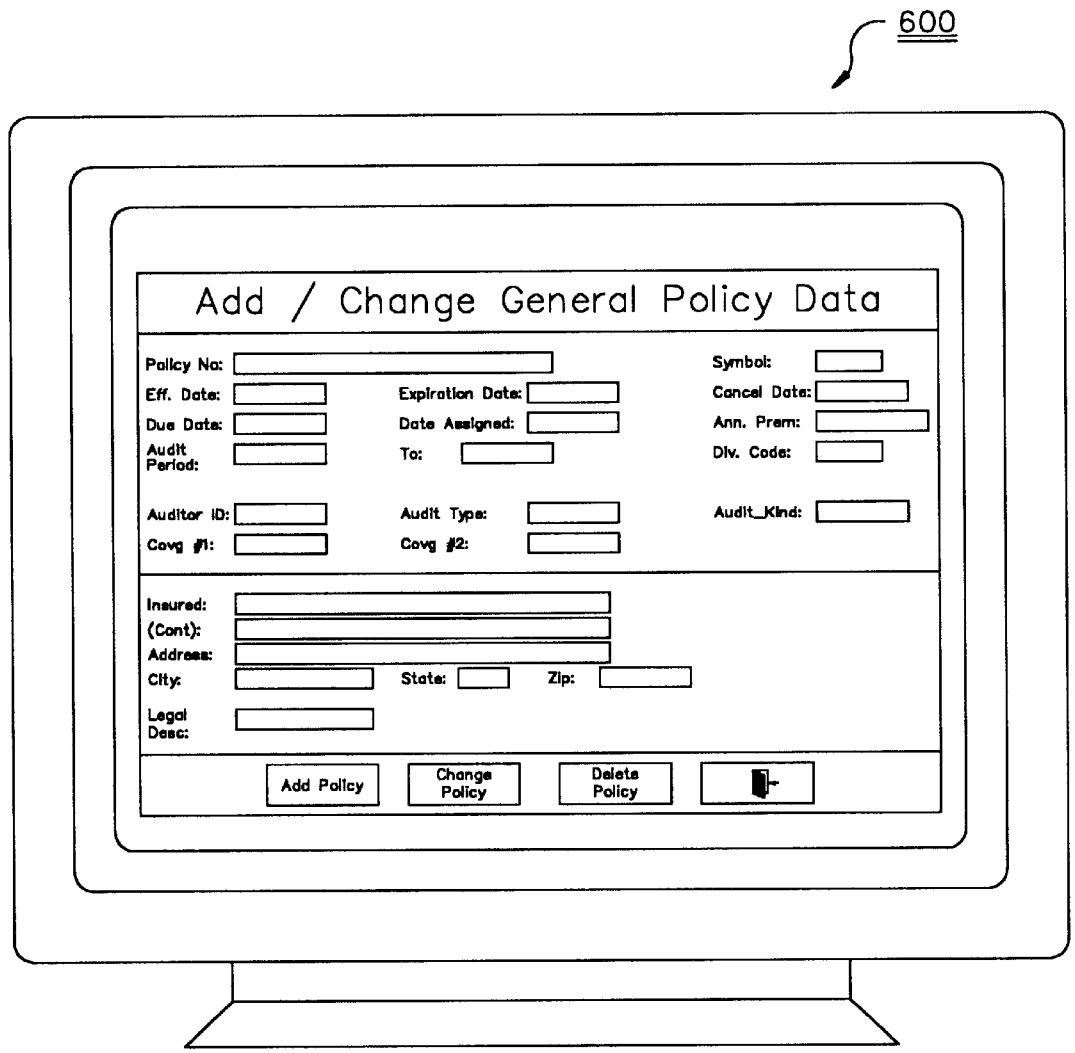
FIG. 6 illustrates a graphical user interface used by an auditor for adding/deleting/modifying records which store general information for each insurance policy being audited, in accordance with a preferred embodiment of the present invention.

An auditor at the Audit Inventory Menu may also add/delete an insurance policy or modify general policy information stored in the system's database in step 112 by clicking on the Policy Data text 520 in the Audit Inventory Menu screen. When an auditor clicks on the Policy Data text 520 in the Audit Inventory Menu screen, a graphical user interface 600 (shown in FIG. 6) is displayed and may then be used for adding/deleting/modifying records which store general information for each insurance policy being audited. The general insurance policy information which is displayed and/or modified in step 112 is stored in data records 402, 406, 408 and 410 (shown in FIG. 4A) and data records 412 and 414 (shown in FIG. 4B) and includes the following items listed in Table I below:

TABLE I

Policy No: The policy number of the insured.

Symbol: A policy symbol corresponding to the policy number.

Eff. Date: The inception date of the policy.

Expiration Date: The expiration date of the policy.

Cancel Date: The cancellation date, if applicable, of the policy.

Due Date: The due date of the audit.

Date Assigned: The date the audit was assigned to the auditor.

Ann. Prem. The annual premium of the policy.

Audit Period: The audit period.

Auditor ID: The auditor's identification number.

Audit Type: The type of audit being completed.
P-Physical
V-Voluntary
T-Telephone Audit Kind: The basis for the audit request.
C-Cancellation
E-Expiration
T-Test Audit (Preliminary)
P-Preliminary (Pre-Audit)
R-Re-Audit Covg #1: The coverage type applicable to the audit.
Auto-Auto Coverage, Garage Service or Dealers
Liab-General Liability Coverage
WC-Workers Compensation Coverage Covg #2: If needed, same as Covg #1.

Insured: Insured's full name as shown on policy.

Address: Street address of insured.

City: City of insured.

State: State of insured.

Zip: Zip Code of insured.

Figure 7:
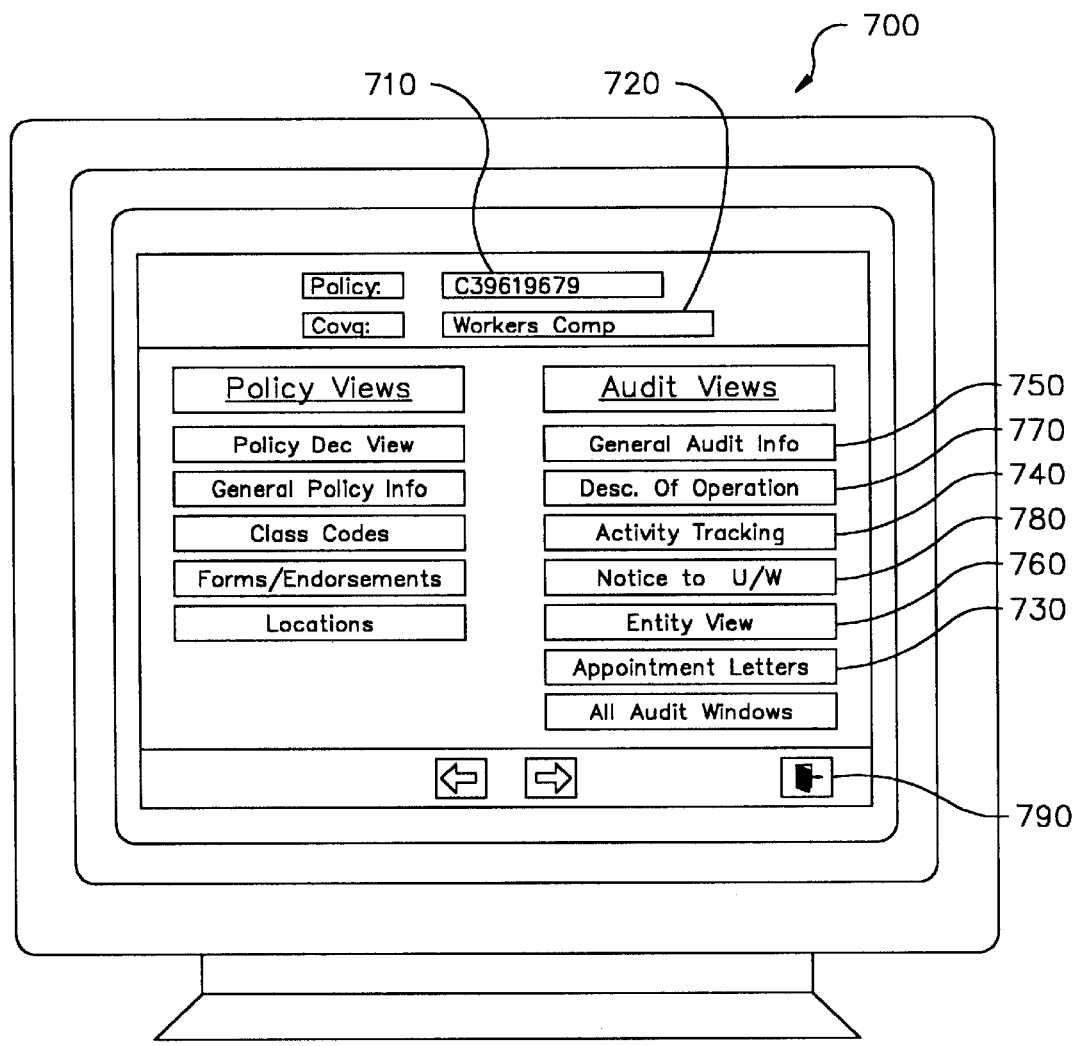
FIG. 7 illustrates a graphical user interface which includes a menu that may be used by an auditor for controlling the operational flow of the auditing system of the present invention.

Legal Desc: Legal description of the insured.
C-Corporation
P-Partnership
I-Individual
O-Other After an auditor has retrieved a listing or inventory of his or her audits using the Audit Inventory Menu as described above, the auditor may next select (in step 114) an audit to work on by clicking on one of the individual audits listed by the Audit Inventory Menu. Following the selection of an individual audit from the Audit Inventory Menu, system 100 proceeds to step 120 where a Policy View/Audit View Menu 700 (an example of which is shown by FIG. 7) is displayed for the auditor. The policy number and coverage type displayed in boxes 710 and 720, respectively, of Menu 700 are automatically populated by system 100 based on the individual audit selected from the auditor's inventory in step 114. From the Policy View/ Audit View Menu 700, the auditor may selectively direct system 100 to proceed to one of several alternative steps by clicking on a particular box in the Menu 700. More particularly, by clicking on box 730, the auditor may direct system 100 to proceed to step 122 wherein one or more appointment letters may be issued to insureds being audited; by clicking on box 740, the auditor may direct system 100 to proceed to step 124 wherein audit activity information may be reviewed and/or updated; by clicking on box 750, the auditor may direct system 100 to proceed to step 126 wherein general audit information may be entered into the system; by clicking on box 760, the auditor may direct system 100 to proceed to step 132 wherein financial information for each entity associated with the policy number displayed in box 710 may be entered, reviewed and/or analyzed; by clicking on box 770, the auditor may direct system 100 to proceed to step 136 wherein a description of the insured's business operations may be entered, reviewed and/or modified; and by clicking on box 780, the auditor may direct system 100 to proceed to step 138 wherein one or more written notices setting forth the results of an audit may be generated for forwarding to an underwriter. Following the completion of any of the steps 122, 124, 126, 132, 136 or 138, system 100 proceeds back to step 120 where the Policy View/Audit View Menu 700 is displayed for the auditor. The auditor may exit system 100 at step 140 by clicking on box 790.

Figure 8:
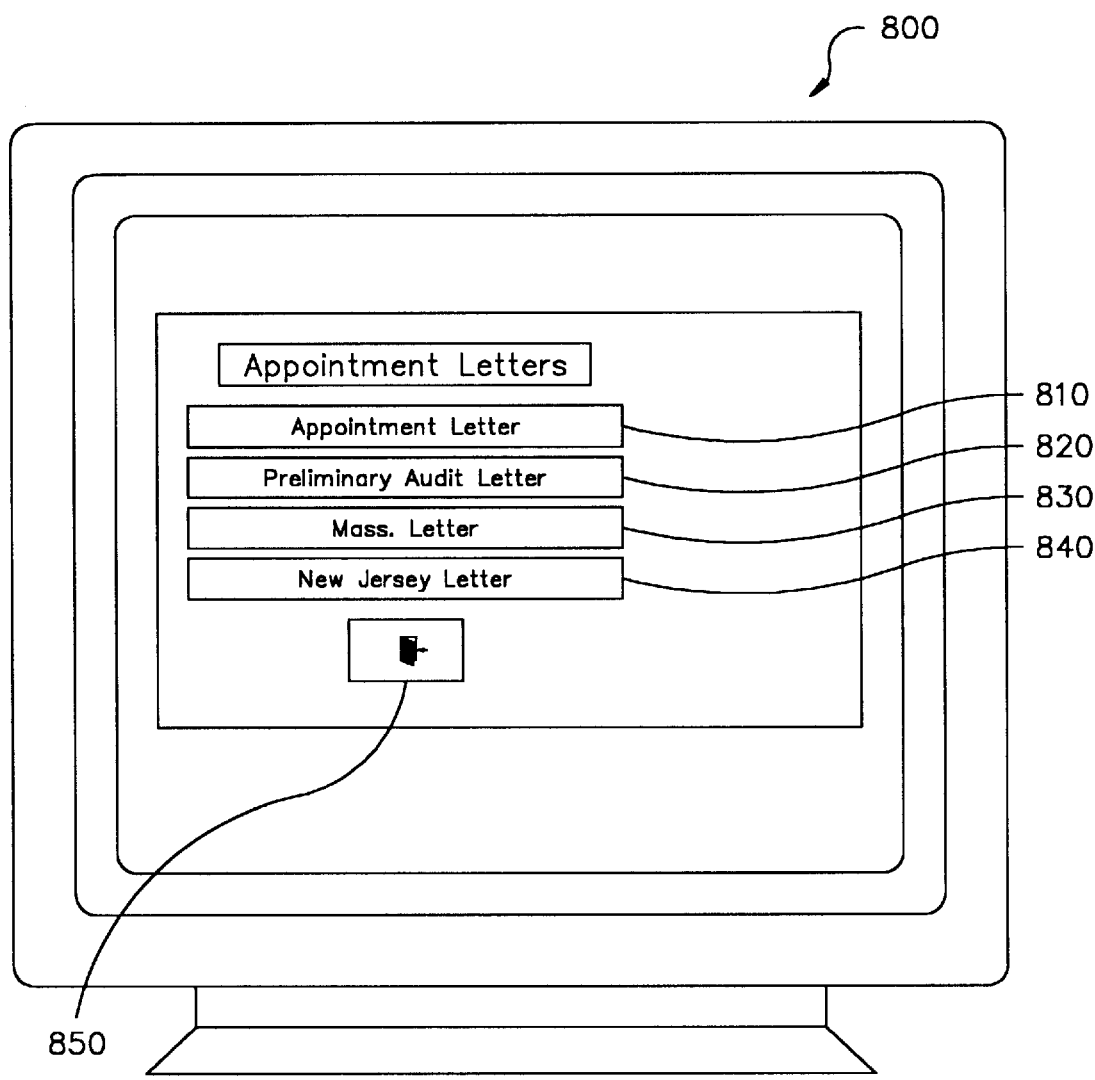
FIG. 8 illustrates a graphical user interface which includes an Appointment Letter Menu used by an auditor for selecting amongst a plurality of pre-prepared form appointment letters that may be generated using the present invention and used for scheduling an audit appointment.
Figure 9:
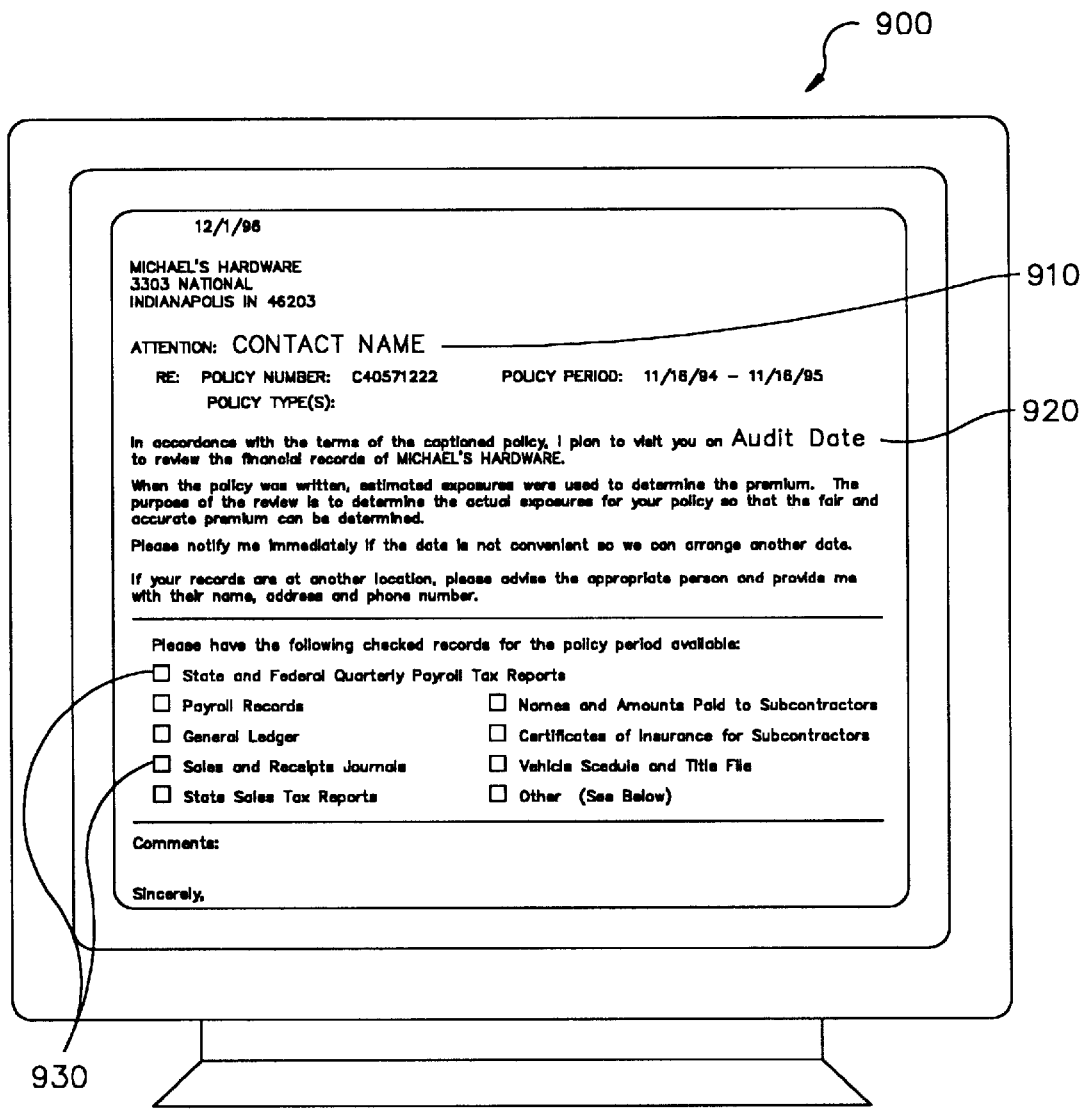
FIG. 9 illustrates a graphical user interface which includes an exemplary appointment letter for scheduling an audit appointment which may generated in accordance with a preferred embodiment of the present invention.

If an auditor wishes to schedule an appointment for an audit, the auditor clicks on box 730, and system 100 then proceeds to step 122 wherein an Appointment Letter Menu 800 (shown in FIG. 8) is displayed for the auditor. The Menu 800 includes boxes 810, 820, 830 and 840 which correspond to different pre-prepared form letters to be used by an auditor in scheduling audit appointments. Upon clicking one of the boxes 810, 820, 830 or 840, a form of an appointment letter (such as, for example, letter 900 shown in FIG. 9) is automatically generated by system 100. In generated this form letter, system 100 pre-fills the insured's name and address, policy type, policy number and policy period into the letter based on information previously entered and stored in database 400. In order to complete the appointment letter 900, an auditor then enters a contact name 910, an audit date 920 and designates the records 930 that will be required for the audit. In addition to indicating the contact name 910 and audit date 920 on appointment letter 900, system 100 stores the contact name 910 and audit date 920 from the letter in data records 414 and 416 (shown in FIG. 4D). The auditor may repeat this process to generate further appointment letters, or return to the Policy View/Audit View Menu 700 (step 120) by clicking on box 850.

Figure 10:
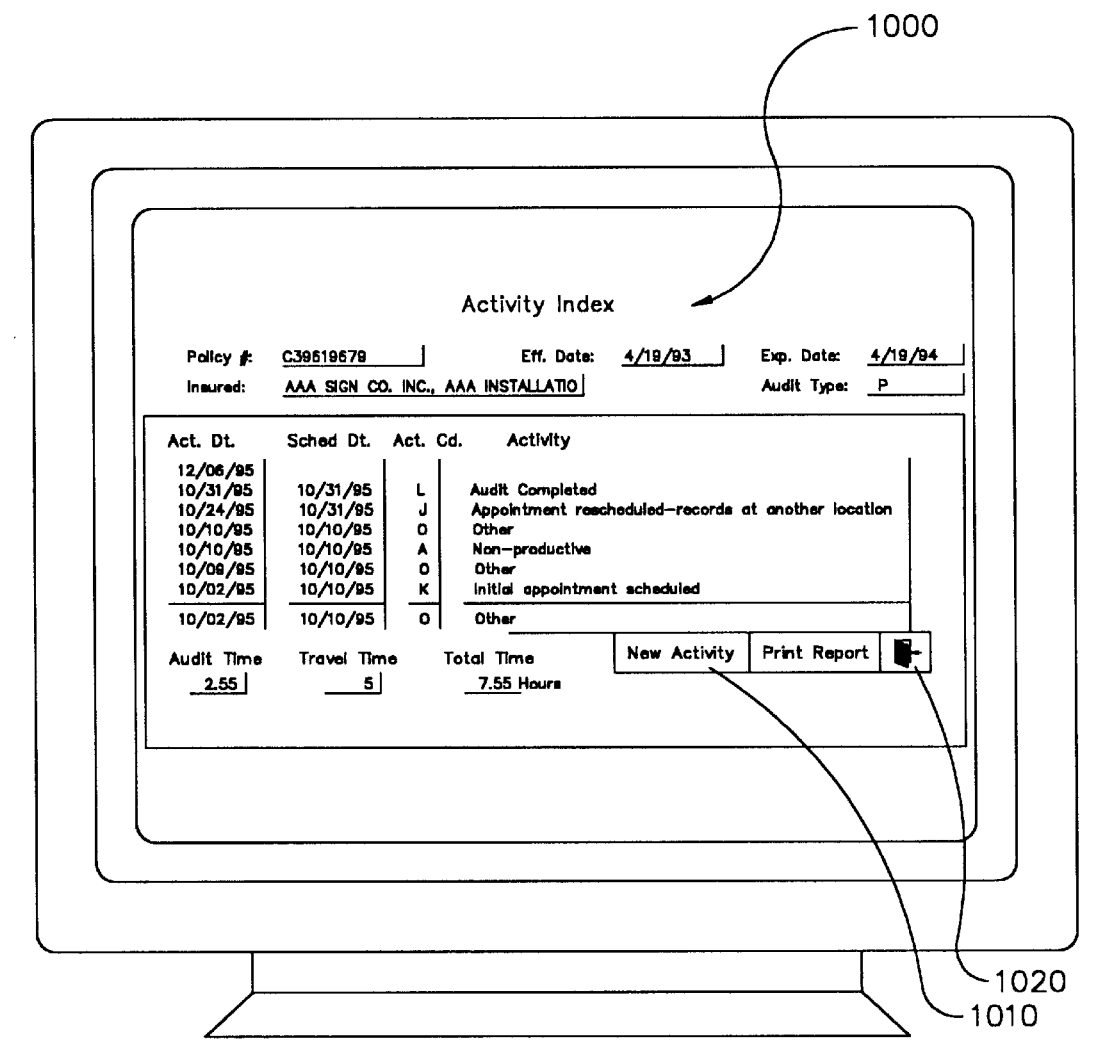
Figure 11:
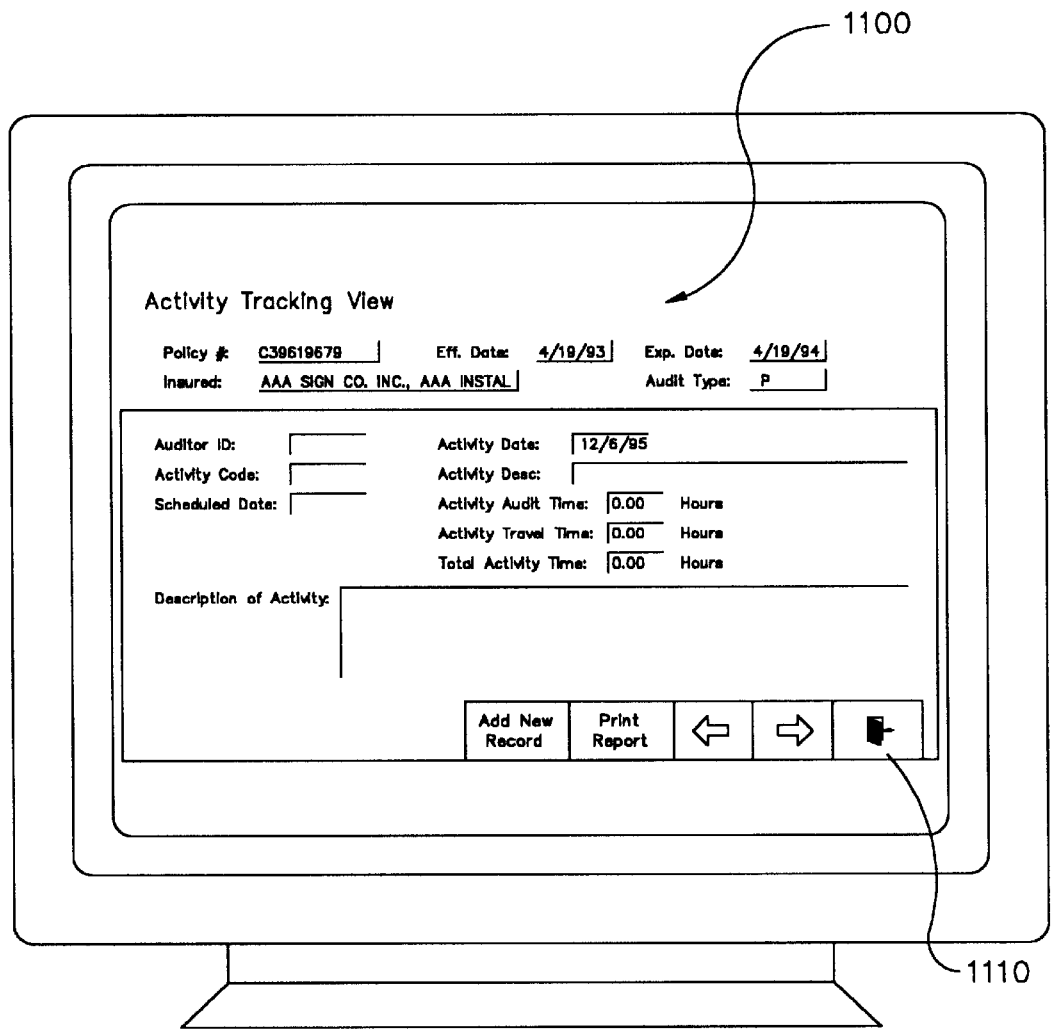
FIG. 11 illustrates a graphical user interface used by an auditor for entering information representing an individual auditing activity, in accordance with a preferred embodiment of the present invention.
Figure 13:
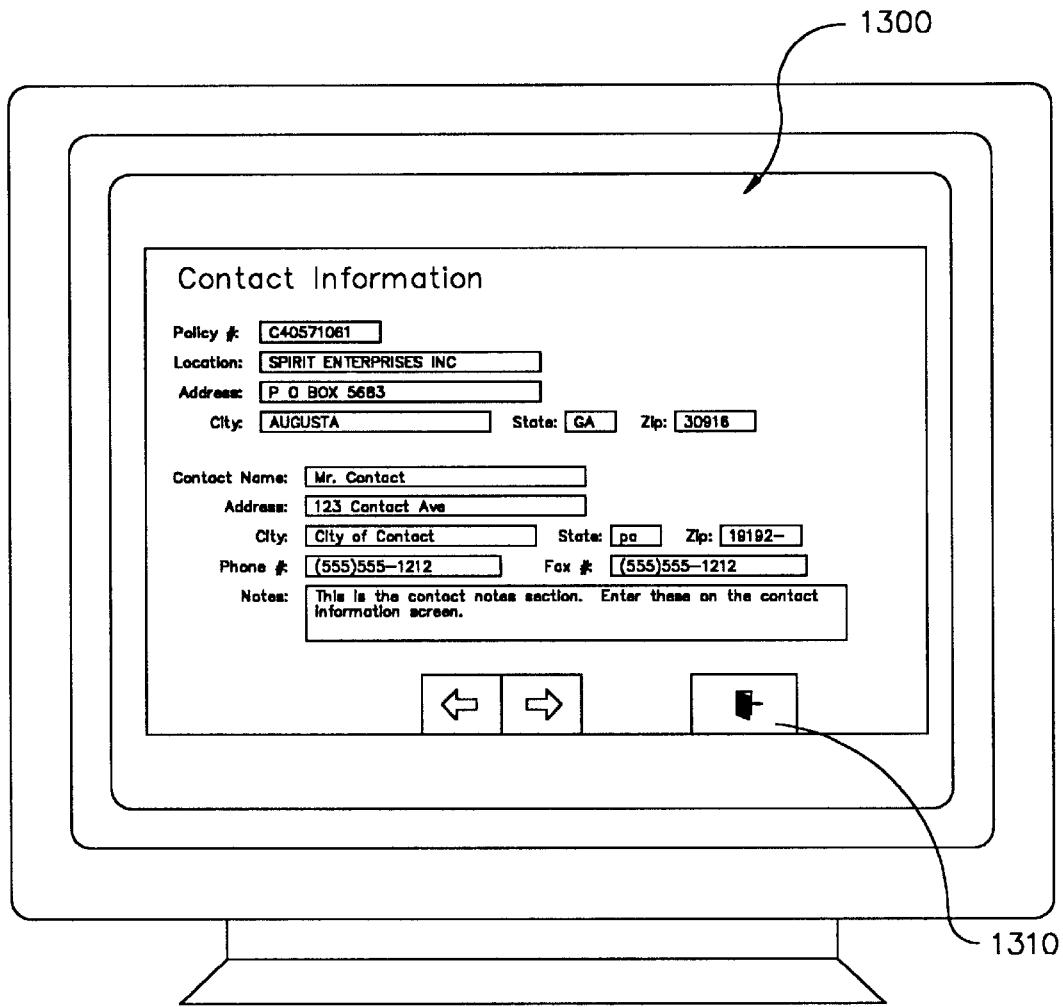
FIG. 13 illustrates a graphical user interface used by an auditor for entering information representing the appropriate person at each location of an insured who the auditor will use as a contact throughout the auditing process, in accordance with a preferred embodiment of the present invention.
Figure 14:
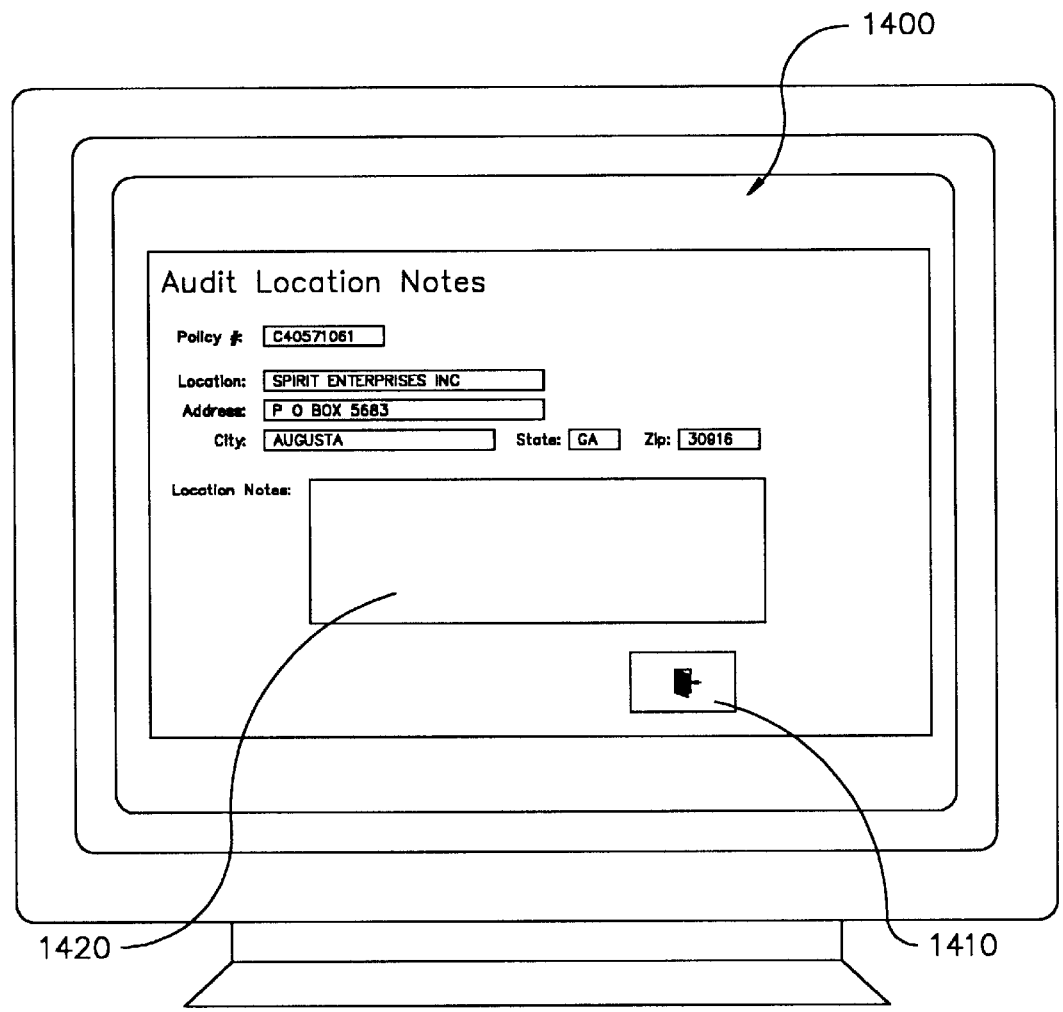
FIG. 14 illustrates a graphical user interface used by an auditor for entering free form notes pertaining to an audit location, in accordance with a preferred embodiment of the present invention.

Upon returning to Menu 700, if an auditor wishes to review and/or update audit activity information, the auditor clicks on box 740, and system 100 then proceeds to step 124 wherein an Activity Index screen 1000 (shown in FIG. 10) is displayed for the auditor. System 100 automatically retrieves and displays information corresponding to the policy number which previously appeared in box 710 of Menu 700 such as, for example, the effective and expiration dates of the policy, the insured's name and the audit type corresponding to the policy, at the top of Activity Index screen 1000 based on information previously stored in database 400. In addition, a chronological listing of all auditing activities related to the policy is also displayed as part of Activity Index screen 1000. The information displayed in Activity Index screen 1000 may be used by an auditor as a diary for documenting all audit activities related to a particular policy. In order to enter a new activity onto the Activity Index screen 1000, an auditor clicks on box 1010, after which, system 100 displays Activity Tracking view screen 1100 (shown in FIG. 11). Using this screen

1100, an auditor can enter information representing an individual auditing activity into the system. The information entered using screen 1100 consists, for example, of the date and time required for the auditing activity, and is stored by system 100 in data records 416 and 418 shown in FIG. 4D. After entering information pertaining to an individual auditing activity into the system, the auditor may return to the Activity Index screen 1000 by clicking on- box 1110 and, from there, the auditor may return to the Policy View/Audit View Menu 700 (step 120) by clicking on box 1020.

Figure 12:
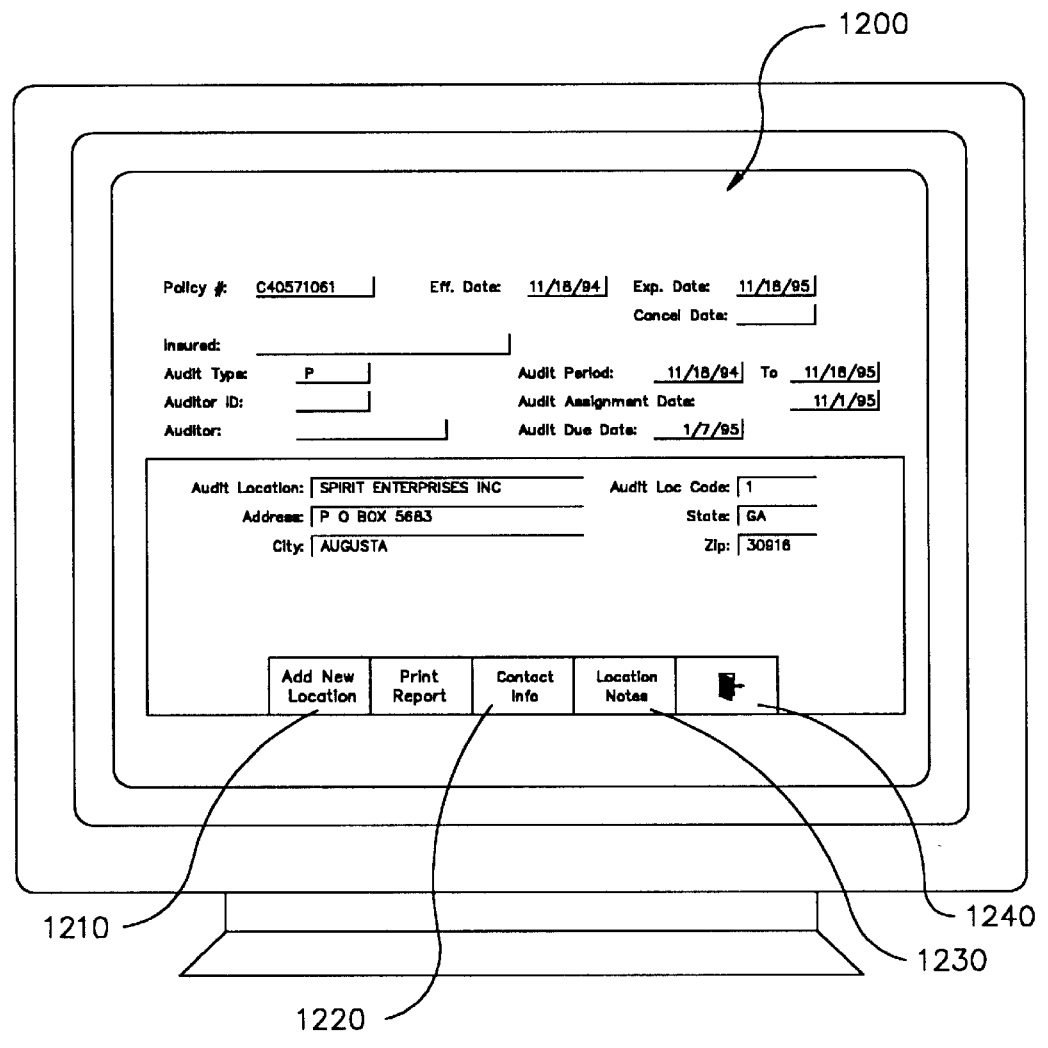

Upon returning to Menu 700, if an auditor wishes to enter general audit information into the system, the auditor clicks on box 750, and system 100 then proceeds to step 126 wherein an Audit Location screen 1200 (shown in FIG. 12) is displayed for the auditor. System 100 automatically retrieves and displays information corresponding to the policy number which previously appeared in box 710 of Menu 700 such as, for example, the effective and expiration dates of the policy, the insured's name and the audit type corresponding to the policy, at the top of Audit Location screen 1200 based on information previously stored in database 400. As mentioned previously above, an entity may do business at more than one location and may therefore require auditing at each such location. An auditor uses step 126 (and steps 128–130) to input information representing each location which will have to be audited in order to complete an audit for an insured entity. In order to add such information representing an audit location in the system, the auditor clicks on box 1210 and then enters the audit location and address information in the appropriate spaces in screen 1200. The location information input in step 126 is stored in system 100 in data records 404 (shown. in FIG. 4D).

From step 126, an auditor may enter further information representing a contact person at a particular audit location by clicking on box 1220, after which, the system 100 proceeds to step 128 where a Contact Information screen 1300 is displayed for the auditor. System 100 automatically retrieves and displays. information corresponding to the policy number and audit location address which previously appeared in Audit Location screen 1200 at the top of Contact Information screen 1300. An auditor uses step 128 to input information representing the appropriate person at each location of the insured who the auditor will use as a contact throughout the auditing process. The contact information input in step 128 is stored in system 100 in data records 414 (shown in FIG. 4D). After entering information pertaining to a contact person into the system, the auditor may return to the Audit Location screen 1200 by clicking on box 1310.

From step 126, an auditor may also enter further free form text information relating to a particular audit location by clicking on box 1230, after which, the system 100 proceeds to step 130 where an Audit Location Notes screen 1400 is displayed for the auditor. System 100 automatically retrieves and displays information corresponding to the policy number and audit location address which previously appeared in Audit Location screen 1200 at the top of Audit Location Notes screen 1400. An auditor uses step 130 to input free form notes pertaining to an audit location by typing such notes in window 1420. The location information input in step 130 is stored in system 100 in data records 404 (shown in FIG. 4D). After entering location notes into the system, the auditor may return to the Audit Location screen 1200 by clicking on box 1410 and, from there, the auditor may return to the Policy View/Audit View Menu 700 (step 120) by clicking on box 1240.

Figure 15:
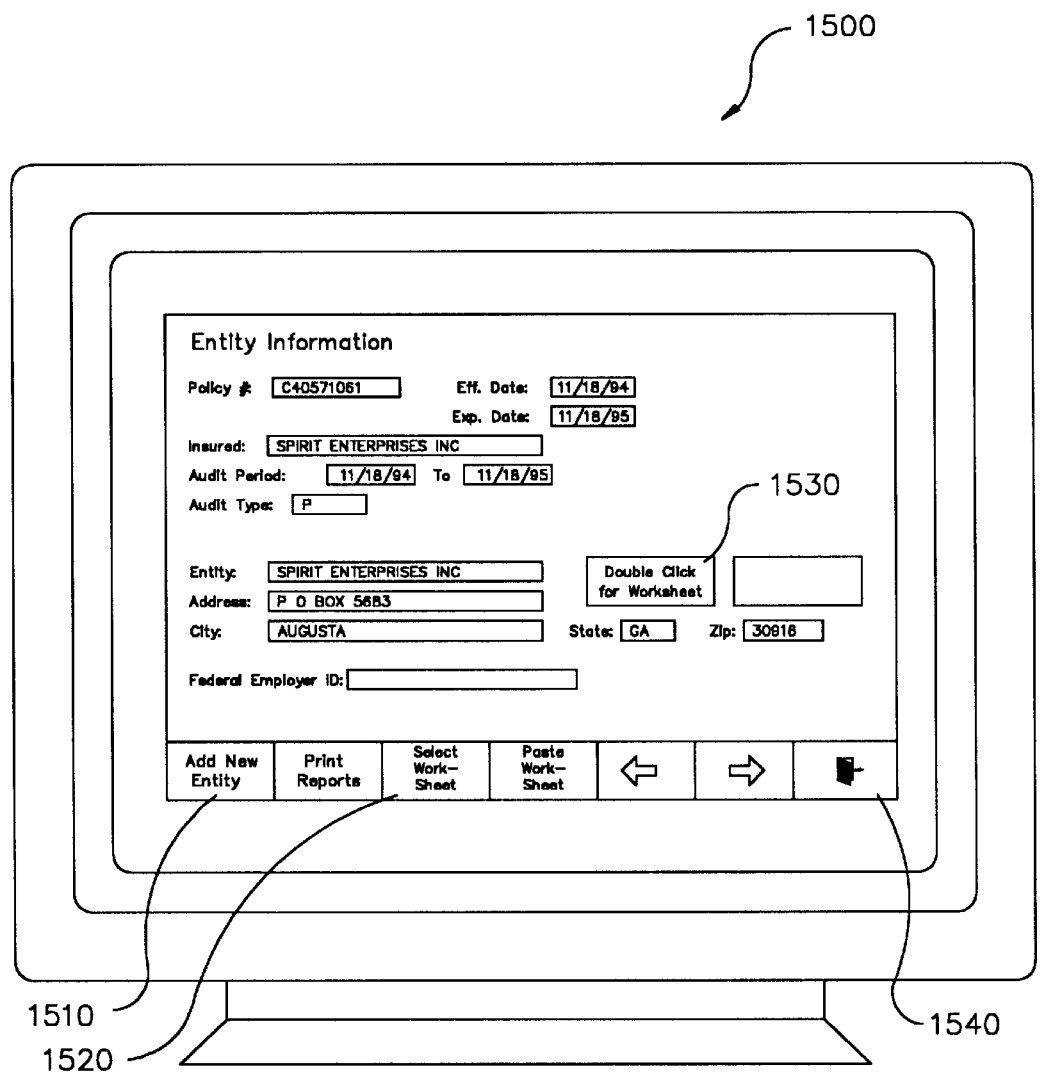
FIG. 15 illustrates a graphical user interface used by an auditor for identifying each entity associated with a particular policy number and for selecting a model worksheet to use for auditing each entity, in accordance with a preferred embodiment of the present invention.

Upon returning to Menu 700, if an auditor wishes to review, enter and/or analyze the financial information of an entity associated with a policy, the auditor clicks on box 760, and system 100 then proceeds to step 132 wherein an Entity Information screen 1500 (shown in FIG. 15) is displayed for the auditor. System 100 automatically retrieves and displays information corresponding to the policy number which previously appeared in box 710 of Menu 700 such as, for example, the effective and expiration dates of the policy, the insured's name, the audit period and the audit type corresponding to the policy, at the top of Entity Information screen 1500 based on information previously stored in database 400. Entity Information screen 1500 may be used initially by an auditor to identify each an every entity associated with a particular policy number. In order to identify a new entity associated with a particular policy number, an auditor clicks on box 1510 and then enters the entity name, address and federal employer identification number in the spaces shown in screen 1500. This entity identification information is then stored in data records 420 (shown in FIG. 4G). In addition to inputting the entity identification information, an auditor selects a model worksheet to use for auditing each entity. The auditor selects a model worksheet to use in auditing the entity by first clicking on box 1520, which causes a list of pre-formatted worksheets (or spreadsheets) to be displayed for the auditor, and then selecting one of the pre-formatted worksheets from the displayed list. Thus, each entity will have one or more selected worksheets that are associated with that entity. Information corresponding to the selected worksheet for a given entity is then stored in data records 420 (shown in FIG. 4G). In addition, all selected worksheets associated with a given entity are stored as an embedded object (designated "Entity$_{OLE}$Worksheet") within datastructure 420 shown in FIG. 4G. Once a particular worksheet has been selected using button 1520, an auditor may access the worksheet in order to enter, reconcile and/or verify financial information associated with the entity (step 134) by clicking on button 1530. The process of entering, reconciling and/or verifying financial information associated with an entity is described in further detail in connection with FIG. 2 below. From Entity Information screen 1500, the auditor may return to the Policy View/Audit View Menu 700 (step 120) by clicking on box 1540.

Figure 20:
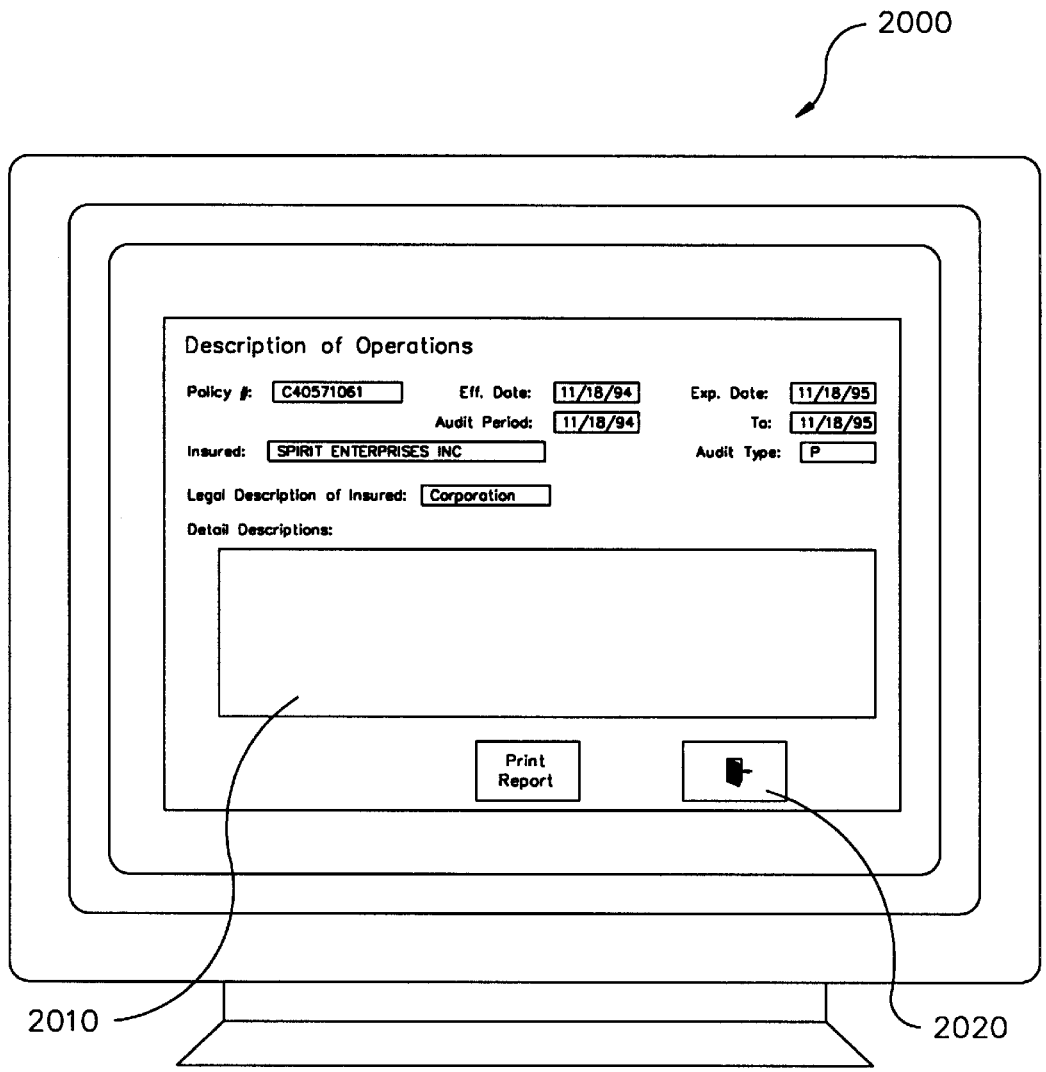
FIG. 20 illustrates a graphical user interface used by an auditor for documenting an insured's business operations, in accordance with a preferred embodiment of the present invention.
Figure 21:
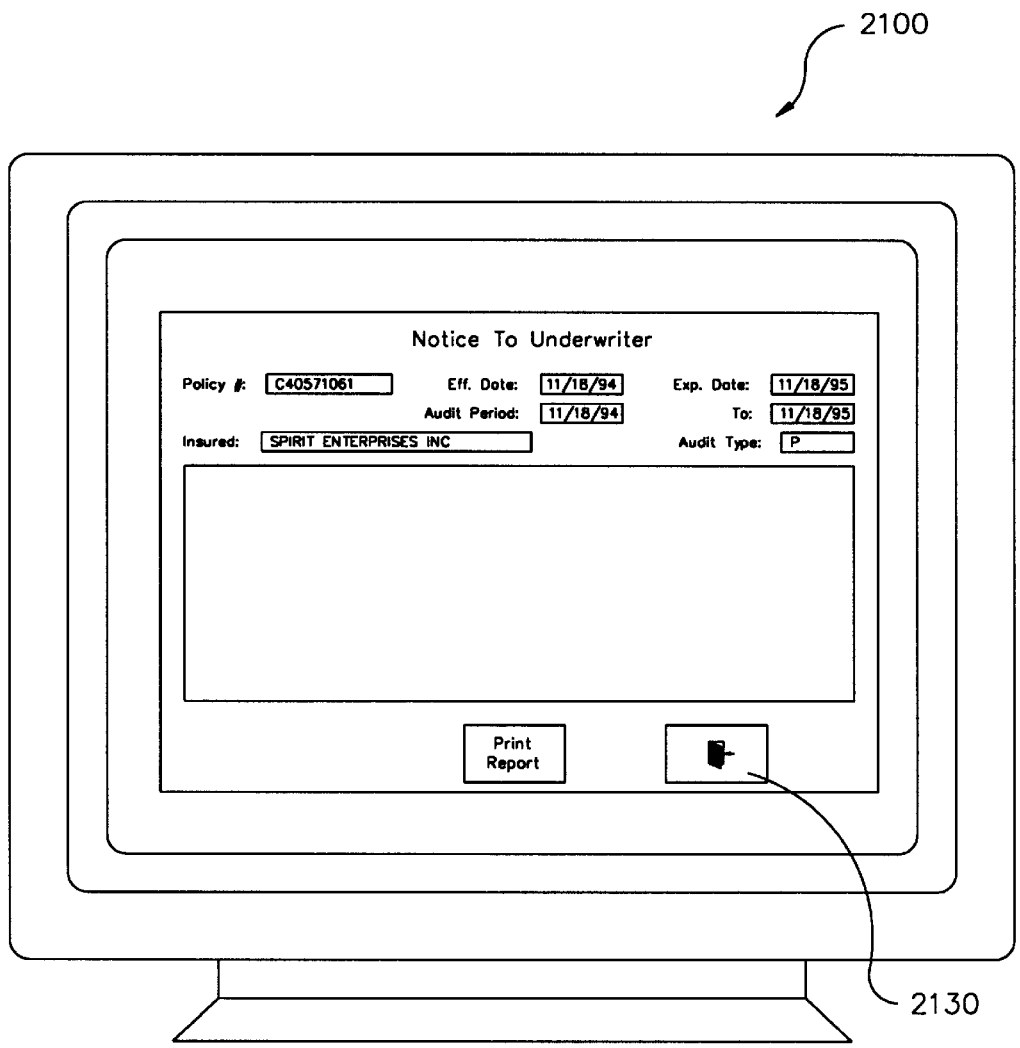
FIG. 21 illustrates a graphical user interface used by an auditor for conveying to an underwriter pertinent information about an insured that has been gathered during the auditing process, in accordance with a preferred embodiment of the present invention.

Upon returning to Menu 700, if an auditor wishes to enter a description of the insured's business operations into the system, the auditor clicks on box 770, and system 100 then proceeds to step 136 wherein a Description of Operations screen 2000 (shown in FIG. 20) is displayed for the auditor. System 100 automatically retrieves and displays information corresponding to the policy number which previously appeared in box 710 of Menu 700 such as, for example, the effective and expiration dates of the policy, the insured's name and the audit type corresponding to the policy, at the top of the Description of Operations screen 2000 based on information previously stored in database 400. An auditor uses step 136 to input free form notes that document all of the insured's business operations by typing such notes in window 2010. The description of operations information input in step 136 is stored in system 100 in data records 404 (shown in FIG. 4D). After entering a description of the insured's operations into the system, the auditor may return to the Policy View/Audit View Menu 700 (step 120) by clicking on box 2020.

Upon returning to Menu 700, if an auditor wishes to generate one or more written notices setting forth the results of an audit for forwarding to an underwriter, the auditor clicks on box 780, and system 100 then proceeds to step 138 wherein a Notice to Underwriter screen 2100 (shown in FIG.

21) is displayed for the auditor. System 100 automatically retrieves and displays information corresponding to the policy number which previously appeared in box 710 of Menu 700 such as, for example, the effective and expiration dates of the policy, the insured's name, the audit period and audit type corresponding to the policy, at the top of the Notice to Underwriter screen 2100 based on information previously stored in database 400. An auditor uses step 138 to convey pertinent information regarding the insured which has been gathered during the auditing process to an underwriter. In order to generate an Underwriter Notice, the auditor simply clicks on the appropriate boxes (not shown) in screen 2100 that convey the auditor's findings and, if necessary, enters free-form comments about the audit in a notes window (not shown). Information representing each completed underwriter notice is stored with the audit in data record 430 (shown in FIG. 4C). An example of an underwriter notice that may be generated by step 138 is shown in FIG. 22. After preparing an Underwriter Notice, the auditor may return to the Policy View/Audit View Menu 700 (step 120) by clicking on box 2130.

Figure 2:
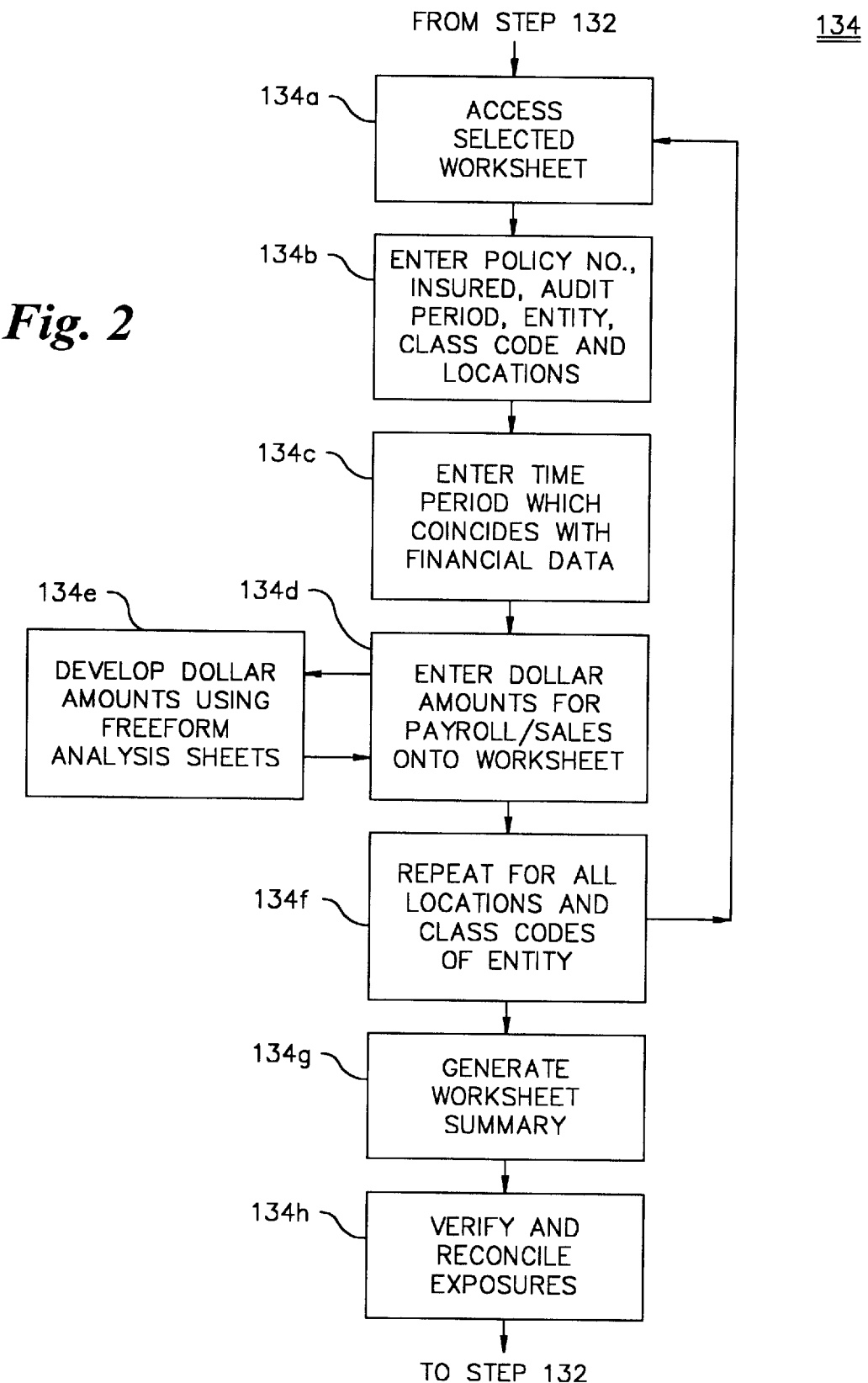
FIG. 2 is a flow diagram illustrating the operation of a computer-implemented system for entering, reconciling and verifying the financial information of an insured entity, in accordance with a preferred embodiment of the present invention.
Figure 16:
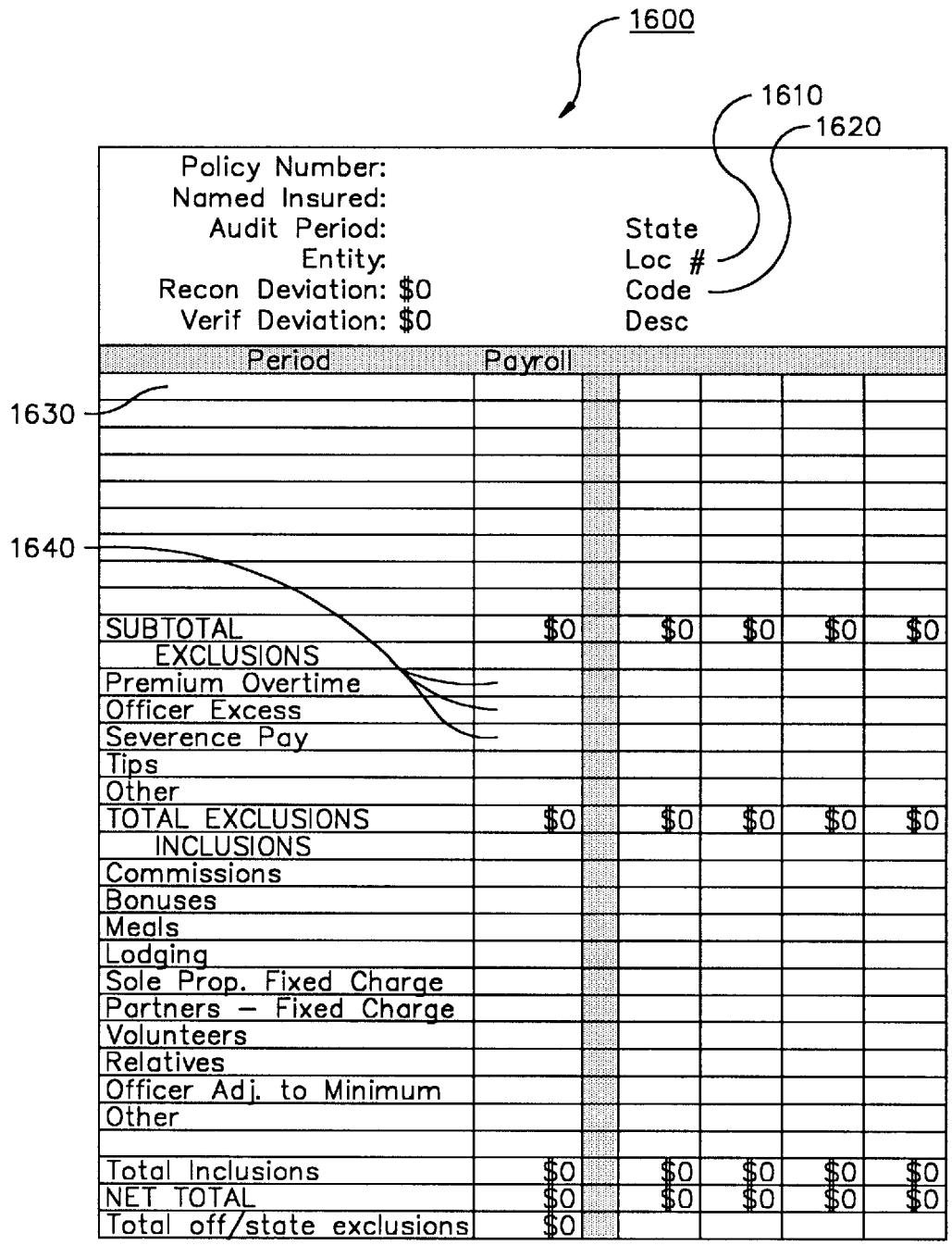
FIG. 16 illustrates a graphical user interface which shows an exemplary worksheet for compiling auditing information about an entity, in accordance with a preferred embodiment of the present invention.
Figure 17:
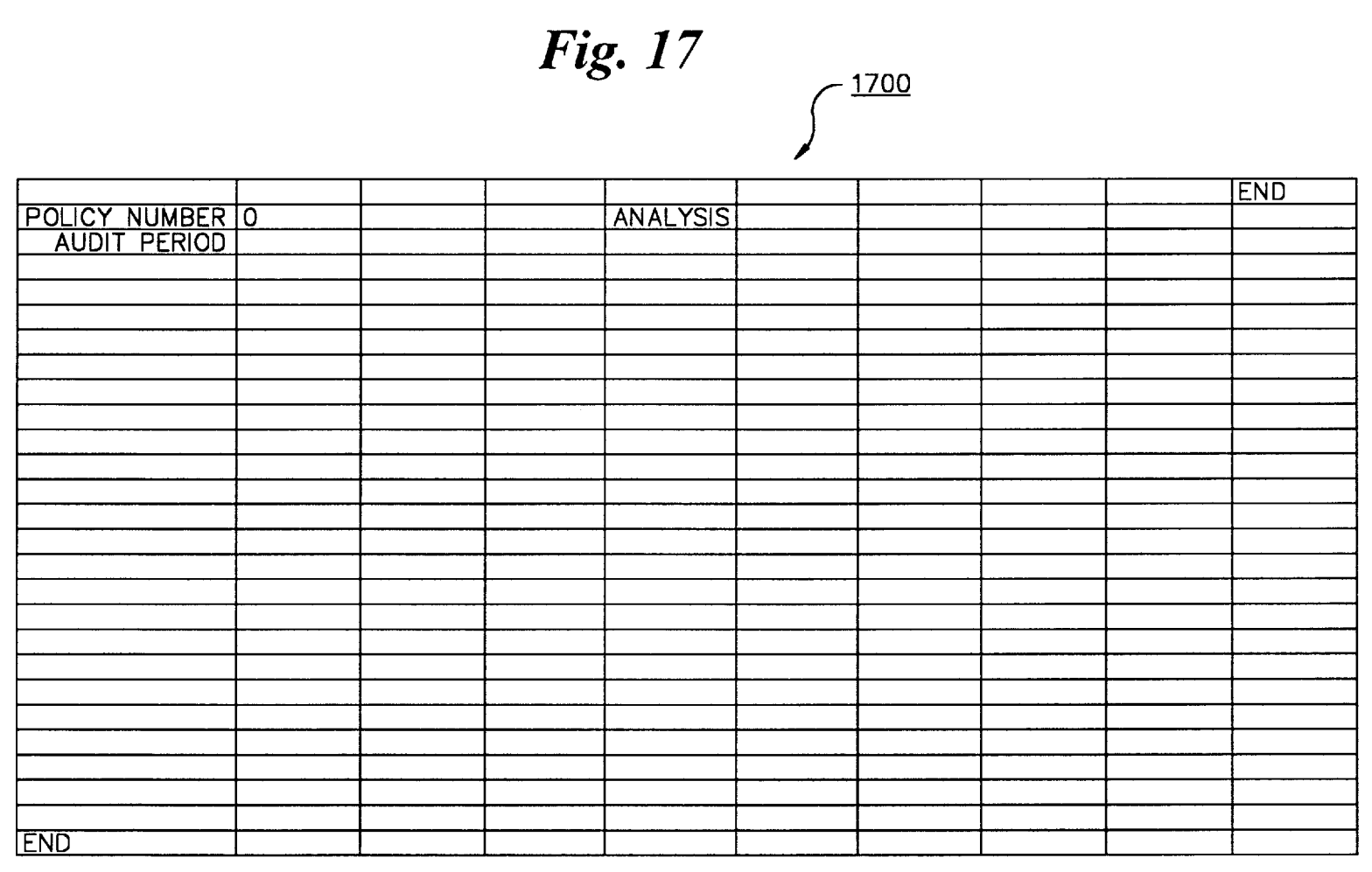
Figure 18:
FIG. 18 illustrates a graphical user interface used by an auditor for compiling and then summing information from one or more worksheets associated with an entity being audited, in accordance with a preferred embodiment of the present invention.

FIG. 2 is a flow diagram illustrating the operation of a computer-implemented system for entering, reconciling and verifying the financial information of an insured entity, in accordance with a preferred embodiment of the present invention. The operation shown in FIG. 2 corresponds to step 134 shown in FIG. 1. Once a particular worksheet has been selected for an entity using button 1520, an auditor may access the selected worksheet (step 134a) in order to enter, reconcile and/or verify financial information associated with the entity by clicking on button 1530. Next, system 100 displays the selected worksheet (such as worksheet 1600 shown in FIG. 16) for the auditor. In step 134b, an auditor enters information corresponding to the policy number of the entity being audited, the name of the insured, the audit period, and the identity of the entity being audited at the top of worksheet 1600. In addition, the auditor enters a location. of the entity at space 1610 and a class code at space 1620 representing an employee type (e.g., clerical, administrative, factory, etc.) employed by the entity at the location represented in space 1610. In step 134c, the auditor enters (in space 1630) the time period corresponding to the payroll/sales figures which will be input into sheet 1600. Next, in step 134d, the auditor enters appropriate dollar amount for each payroll/sales amounts for the entity into spaces 1640. The dollar amounts entered in this step are taken from a first source of financial information such as, for example, the accounts payable/accounts receivable records of the entity being audited. System 100 then automatically generates the Subtotal, Total Exclusions, Total Inclusions and Net Total figures based on the amounts input into spaces 1640. As indicated by step 134e, an auditor may optionally use an Analysis worksheet 1700 (shown in FIG. 17) provided by the system to develop some or all of the amounts input into spaces 1640. The financial amounts and other information entered in spaces 1610, 1620, 1630 and 1640 are stored with the audit in data record 420 (shown in FIG. 4G). In step 134f, the process is repeated from step 134a for each location and class code associated with the entity being audited. Next, in step 134g, the system generates and displays (in box 1810) a total exposure value for the entity by compiling and then summing the Net Total from each worksheet 1600 associated with the entity using aWorksheet Summary 1800 (shown in FIG. 18). The total exposure amount shown in box 1810 is stored with the audit in data record 432 (shown in FIG. 4E).

Finally, in step 134h the auditor enters financial information representing the gross exposure amount of the entity into spaces 1910 of verification and reconciliation sheet 1900. The dollar amounts entered in this step are taken from a second source of financial information (different from that used in step 134d) such as, for example, the tax returns of the entity being audited. The auditor checks boxes 1920 to indicate the nature of this second source of financial information. System 100 then automatically determines and displays (in box 1930) any deviation between the exposure amount calculated in step 134g and the gross exposure amount entered by the auditor in step 134h. Window 1940 is provided to allow the auditor to enter free-form notes documenting reasons for the deviation. The information entered and calculated in step 134h is are stored with the audit in data records 434 (shown in FIG. 4G).

Figure 3:
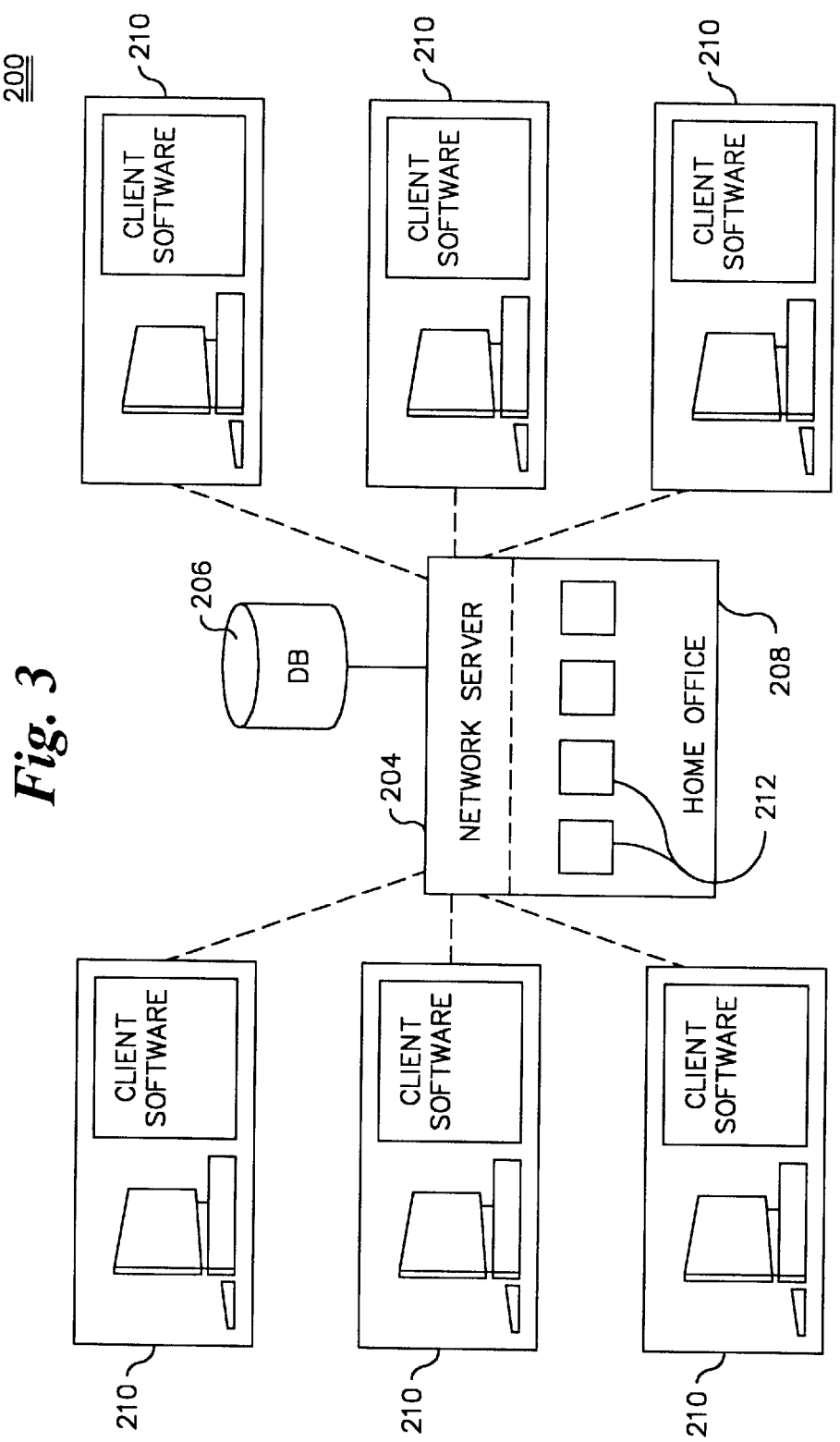
FIG. 3 is a hardware block diagram illustrating the operation of a computer-implemented system for auditing the exposure of an insured, in accordance with a preferred embodiment of the present invention.
Figure 4A:
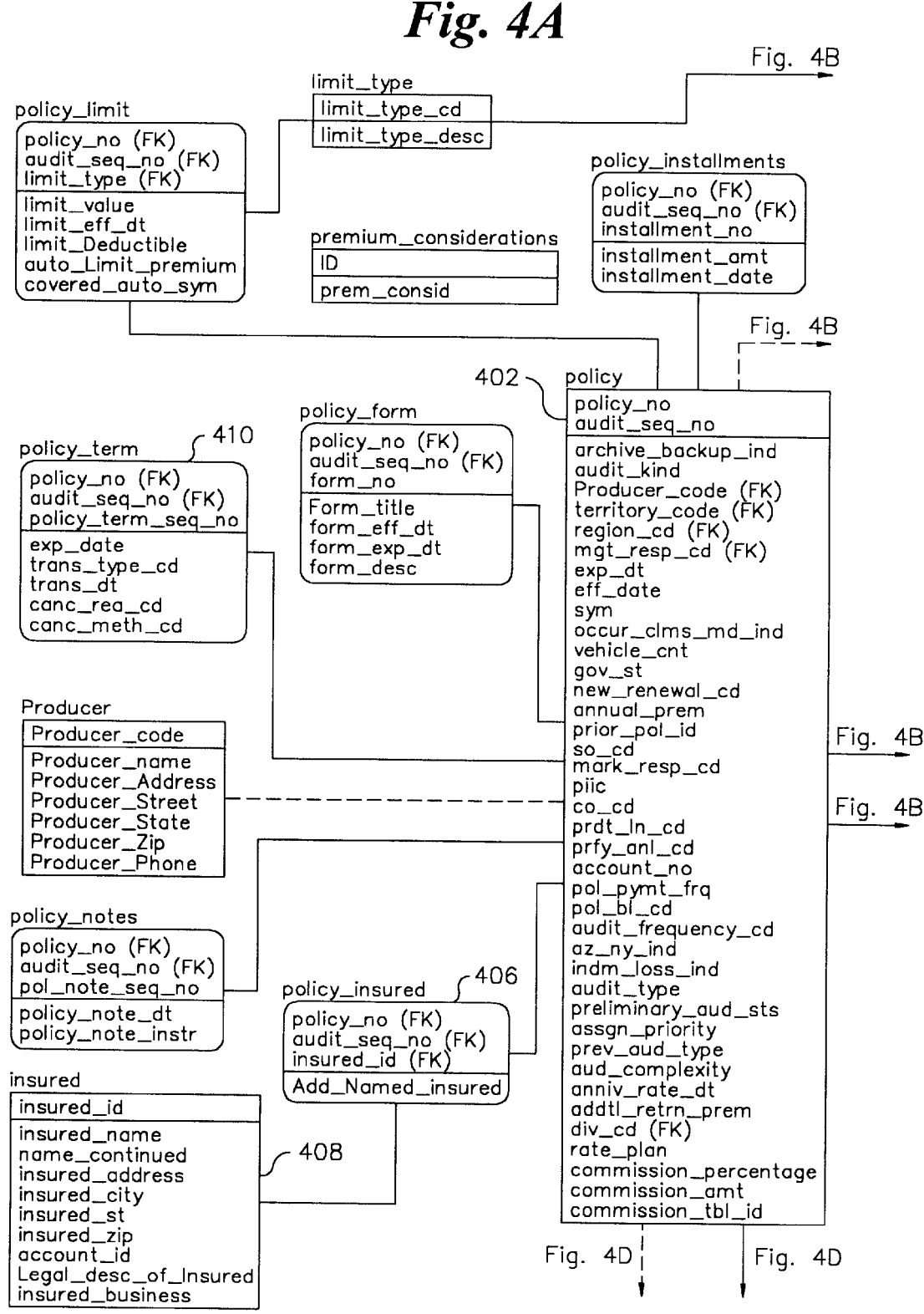
FIGS. 4A–4G depict a block diagram illustrating a data structure used for storing information associated with an audit of an insured, in accordance with a preferred embodiment of the present invention.
Figure 4B:
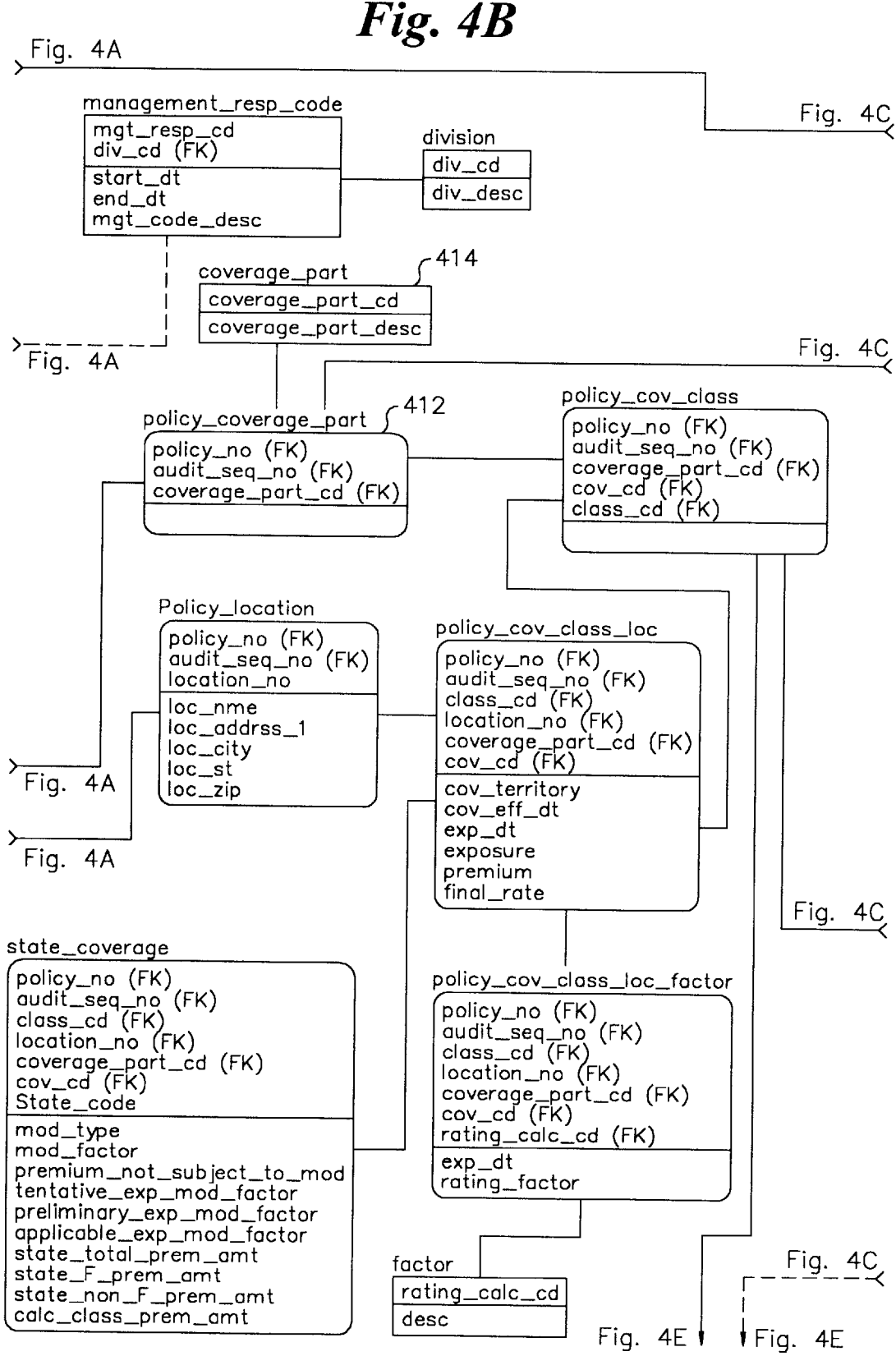
Figure 4C:
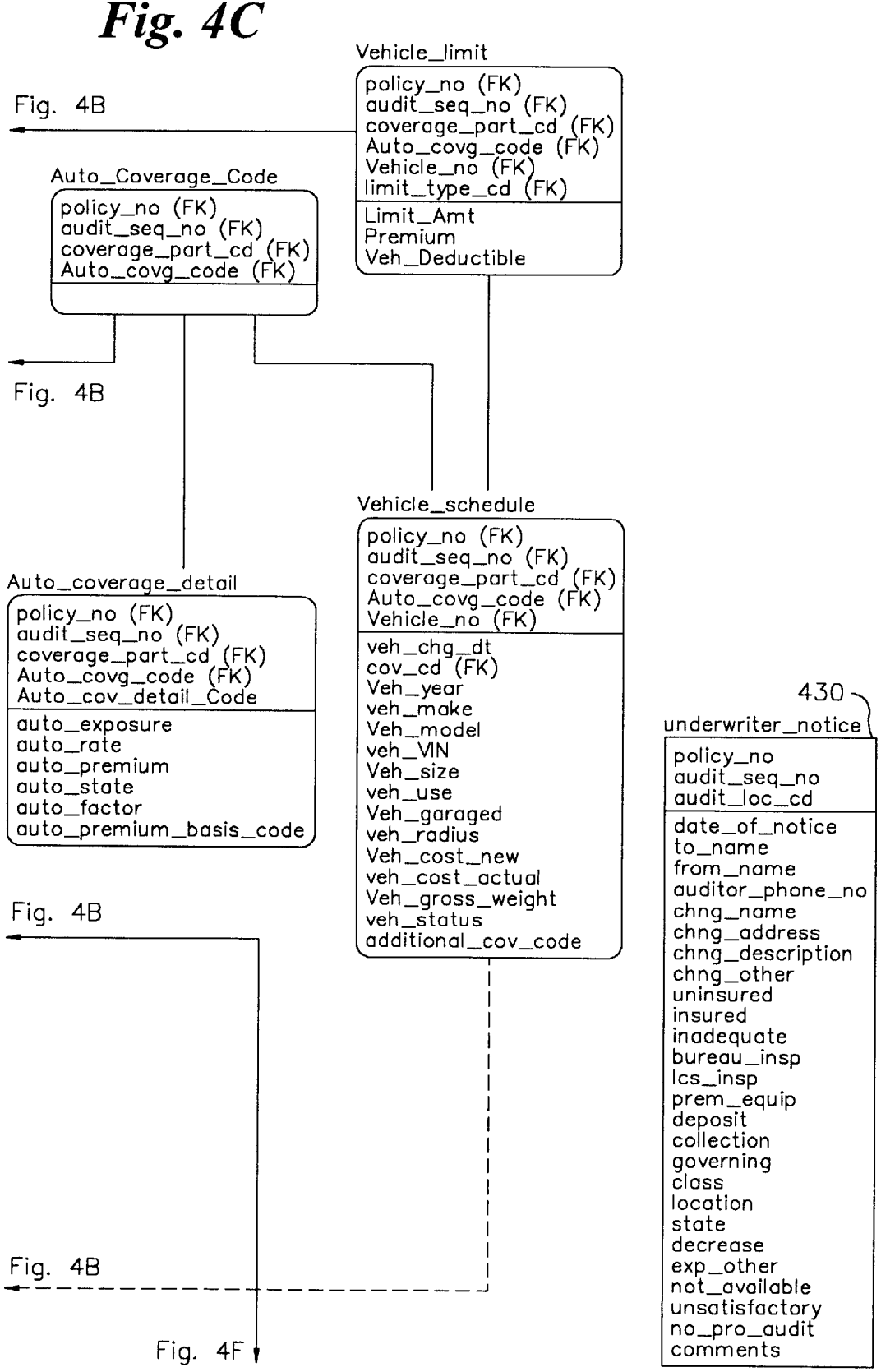
Figure 4D:
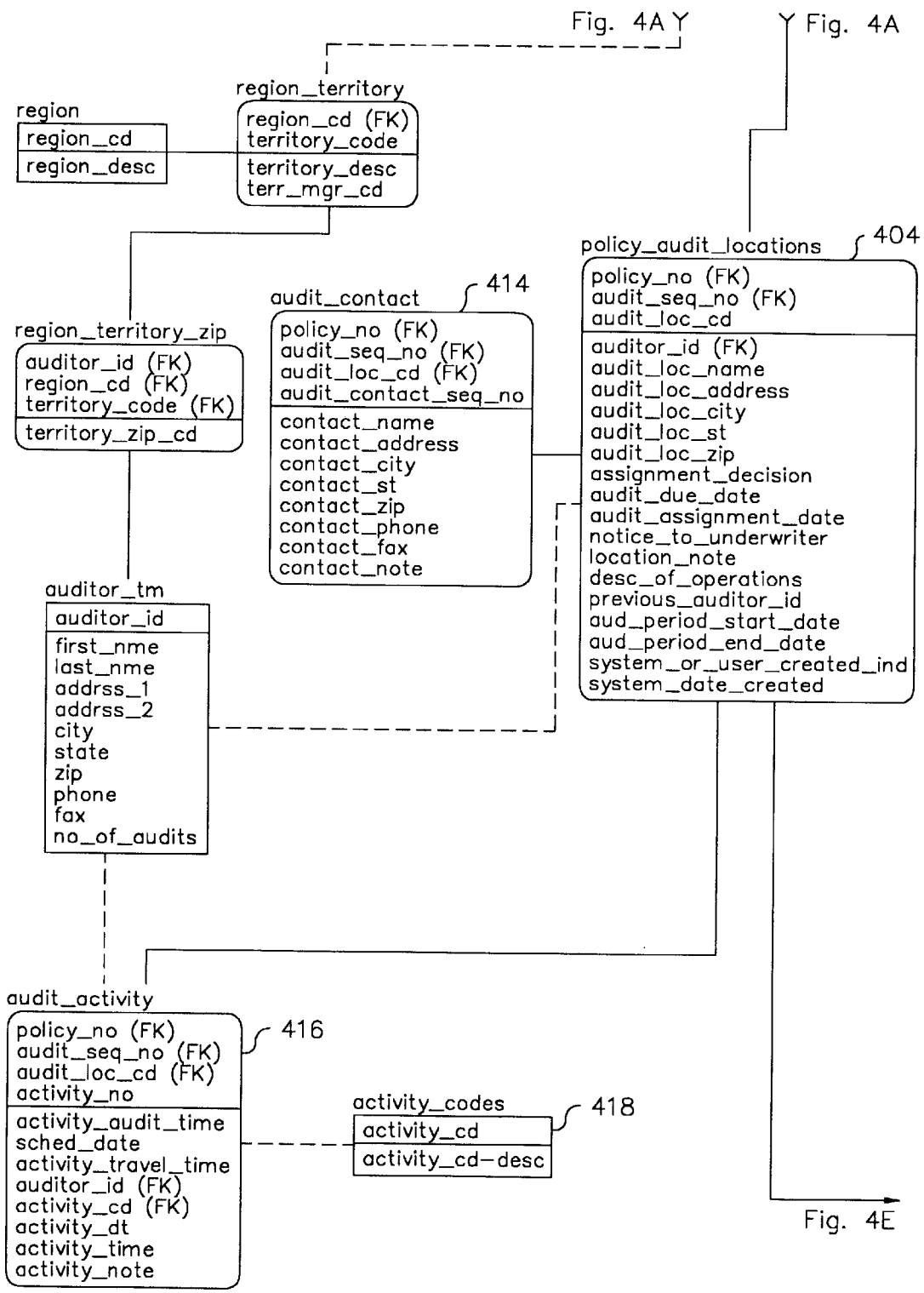
Figure 4E:
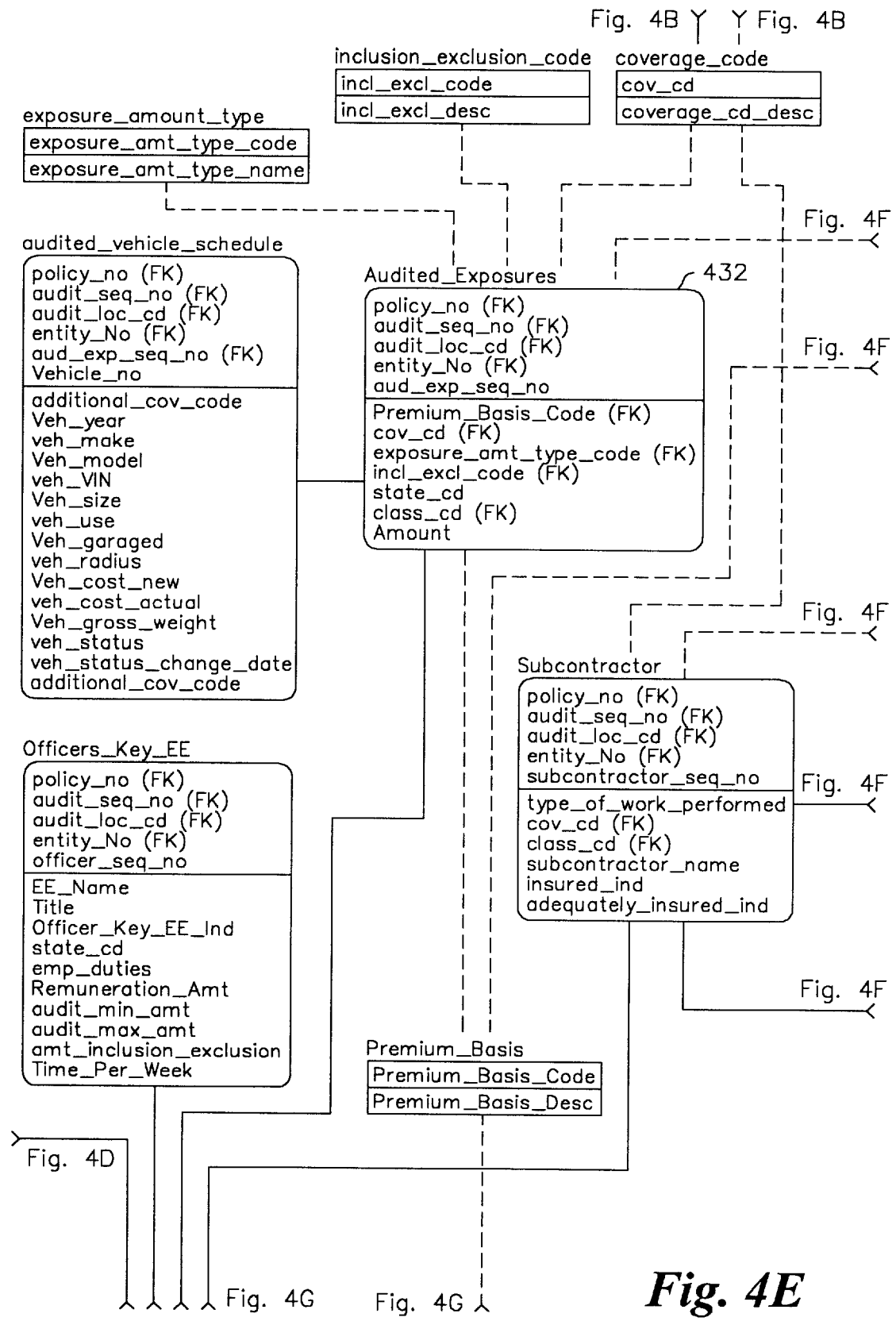
Figure 4F:
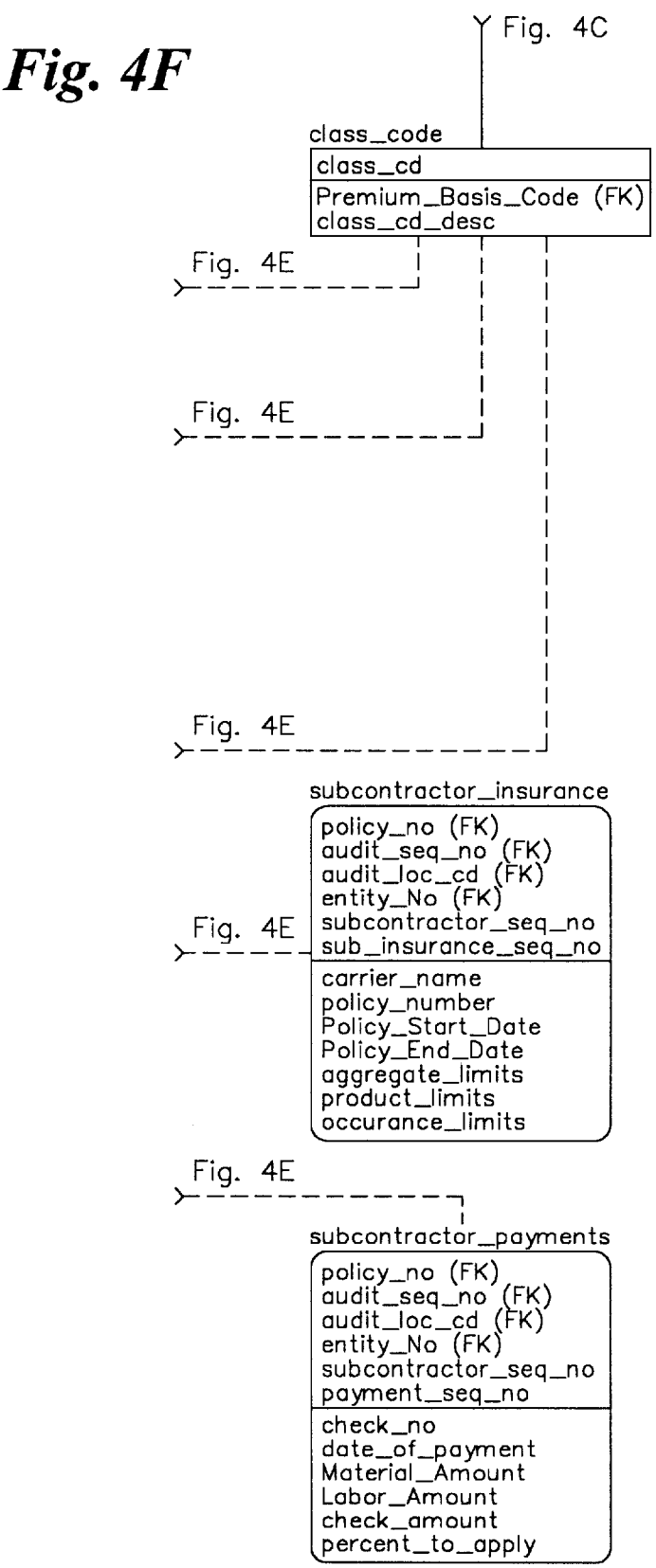
Figure 4G:
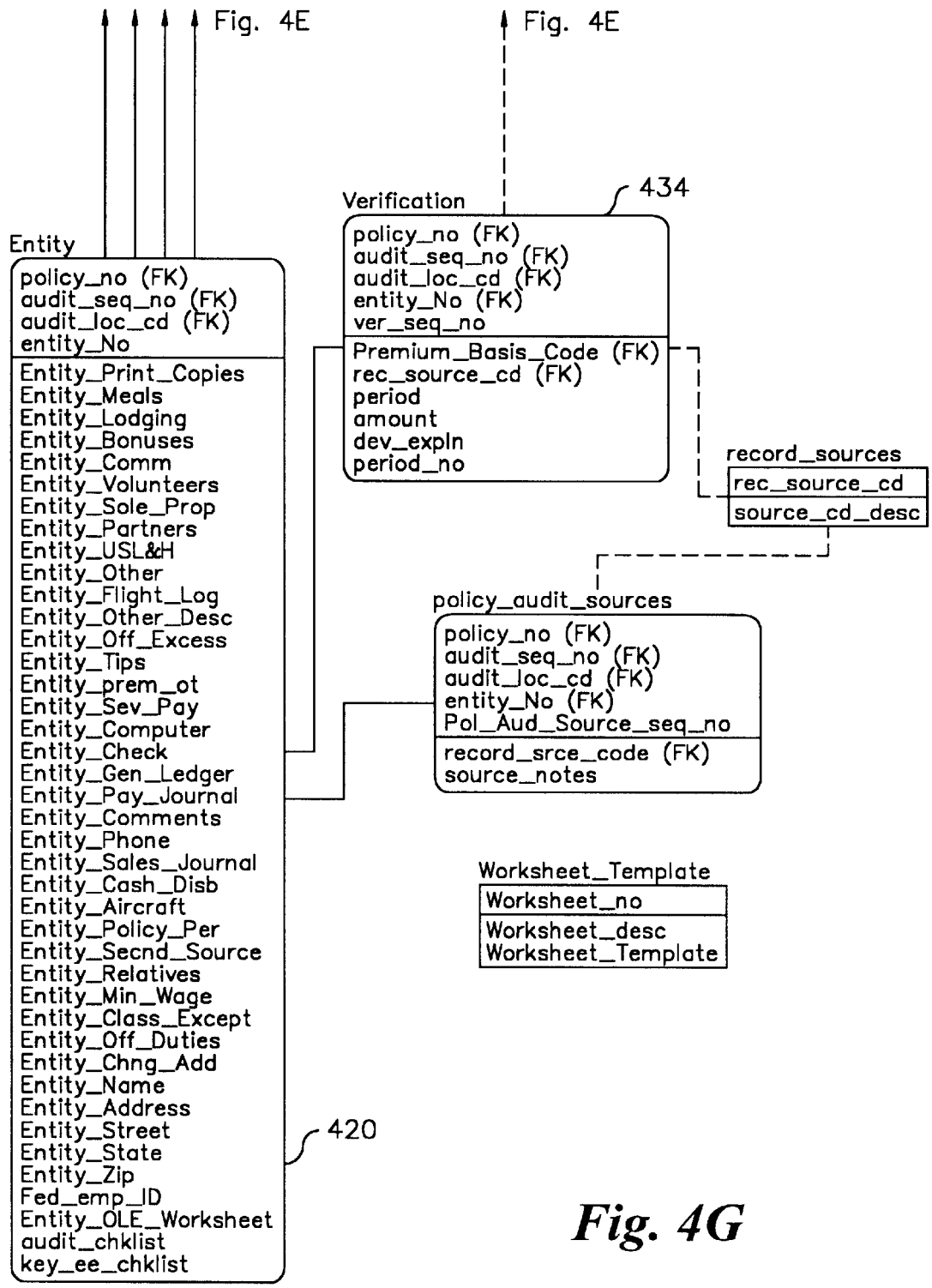

Referring now to FIG. 3, there is shown a hardware block diagram of a system 200 for implementing the software system 100 described above, in accordance with a preferred embodiment of the present invention. Although system 100 may be implemented using a single stand alone personal computer, system 200 is preferably formed of a plurality of remote workstations 210, each of which includes client software for communicating with a network server 204 located at the home office 208 of the company that is performing the auditing. A plurality of workstations 212 are included at the home office for reviewing audit information submitted by auditors in the field through workstations 210. A disk drive or other storage device 206 is coupled to the network server 204, and is used for storing the information represented by database 400. When system 200 is implemented as a network as shown in FIG. 3, one or more auditors using different workstations 210 can perform auditing at different locations of a single entity, and then combine their information to complete the audit of the entity.

In the preferred embodiment of the present invention, database 400 may be implemented in software using the Microsoft® Access® database program, and spreadsheets 1600, 1700, 1800 and 1900 may be implemented using the Microsoft® Excell® spreadsheet program. The feature of embedding spreadsheets 1600, 1700, 1800 and 1900 as objects in database 400 is preferably implemented using the Visual Basic for Applications (or VBA) programming language.

Furthermore, it is to be understood that although the present invention has been described with reference to a preferred embodiment, various modifications, known to those skilled in the art, may be made to the structures and process steps presented herein without departing from the invention as recited in the several claims appended hereto.

What is claimed is:

1. A computer-implemented system for auditing a total exposure of an entity, said total exposure forming the basis of a premium amount to be charged to said entity for an insurance policy, comprising:

(A) means for receiving a plurality of exposure information records from a first source, each of said exposure information records from said first source corresponding to a location of said entity and a class code associated with said location of said entity;

(B) a database, coupled to said means for receiving, for storing said plurality of exposure records from said first source, each of said plurality of exposure records from said first source being stored in said database as a datastructure (C) totaling means for determining a first total exposure amount associated with said entity from said plurality of exposure records from said first source;

(D) means for determining a second total exposure amount associated with said entity from a second source different from said first source; and (E) reconciliation means for reconciling said first total amount by comparing said first total amount to said second total amount, said reconciliation means including means for determining a deviation amount between said first total amount and said second total amount, said reconciliation means for including means for entering into said system an explanation of said deviation amount between said first total amount and said second total amount.

2. The system of claim 1, wherein said means for receiving a plurality of exposure information records is formed from at least one computer spreadsheet.

3. The system of claim 2, wherein said at least one computer spreadsheet is stored as an embedded object in said database.

4. The system of claim 1, further comprising means for inputting information representing coverages associated with said policy, an effective date of said policy, an expiration date of said policy, and all entities associated with said policy into said database.

5. The system of claim 1, further comprising means for automatically generating a document for reporting results of an audit associated with said entity to an underwriter.

6. The system of claim 1, wherein said first source corresponds to accounts payable records of said entity.

7. The system of claim 1, wherein said first source corresponds to accounts receivable records of said entity.

8. The system of claim 1, wherein said second source corresponds to tax returns of said entity.

9. The system of claim 1, wherein said means for receiving is a first workstation, said means for determining said second total exposure amount is performed using a second workstation different from said first workstation, and wherein said first and second workstations are coupled to a network server.

10. The system of claim 1, wherein said datastructure includes an entity number field for storing a code that uniquely identifies said entity in said database, a location field for storing information representing a geographical location of said entity, a class code field for storing information representing a class code associated with said entity, and an amount field for storing an exposure amount of said entity corresponding to said class code at said location.

* * * * *

UNITED STATES PATENT AND TRADEMARK OFFICE
CERTIFICATE OF CORRECTION

PATENT NO. : 5,855,005
DATED : Dec. 29, 1998
INVENTOR(S) : Snyder et al.

It is certified that error appears in the above-indentified patent and that said Letters Patent is hereby corrected as shown below:

In the claims,

Column 11, Line 6

Delete the first occurrence of "for" and substitute --further-- therefor.

Signed and Sealed this

Twenty-third Day of November, 1999

Q. TODD DICKINSON

Attest:

Attesting Officer

Acting Commissioner of Patents and Trademarks